INVENTOR.
HARRY C. MAY
BY
A.A. Steinmiller
ATTORNEY

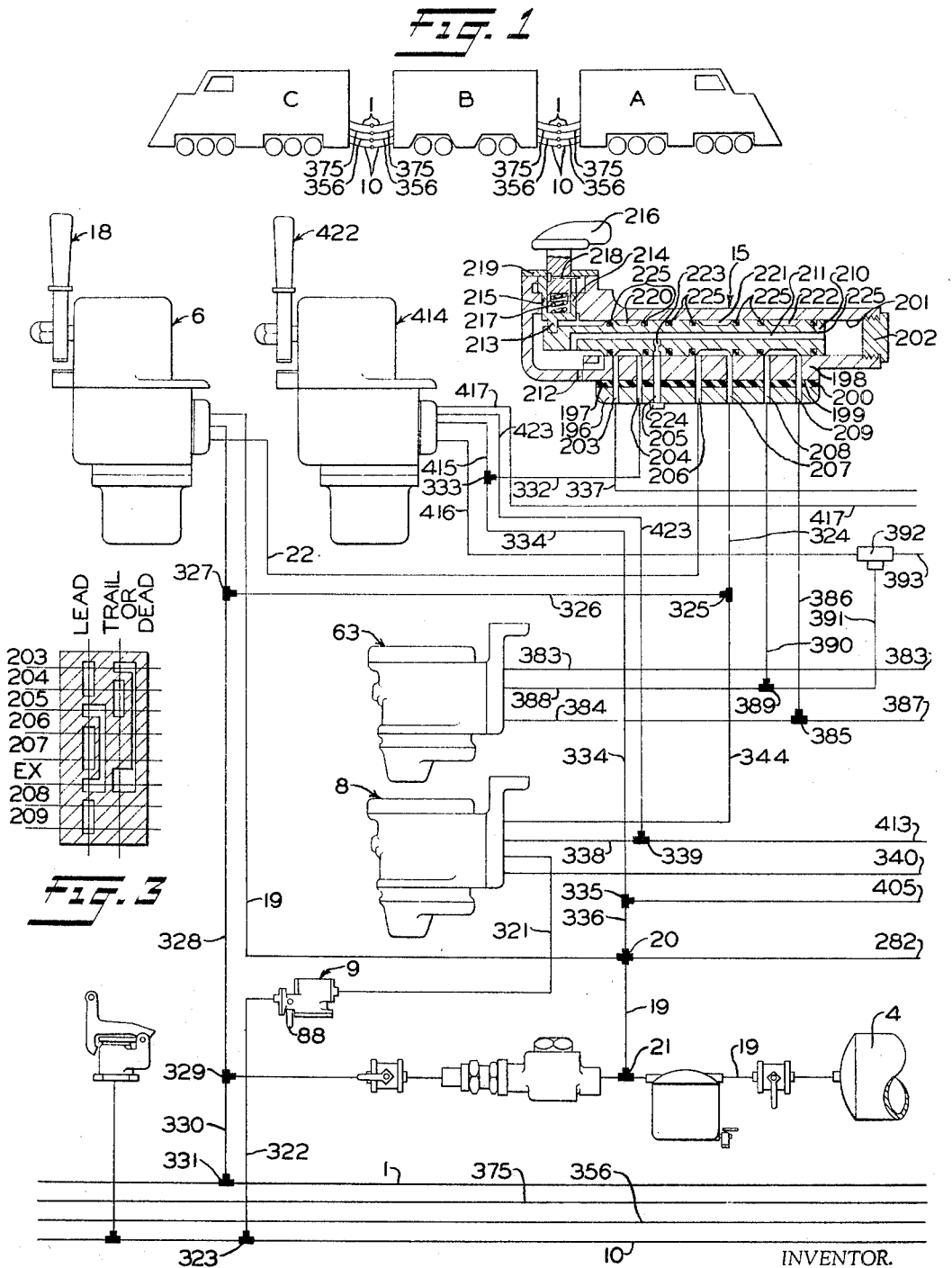

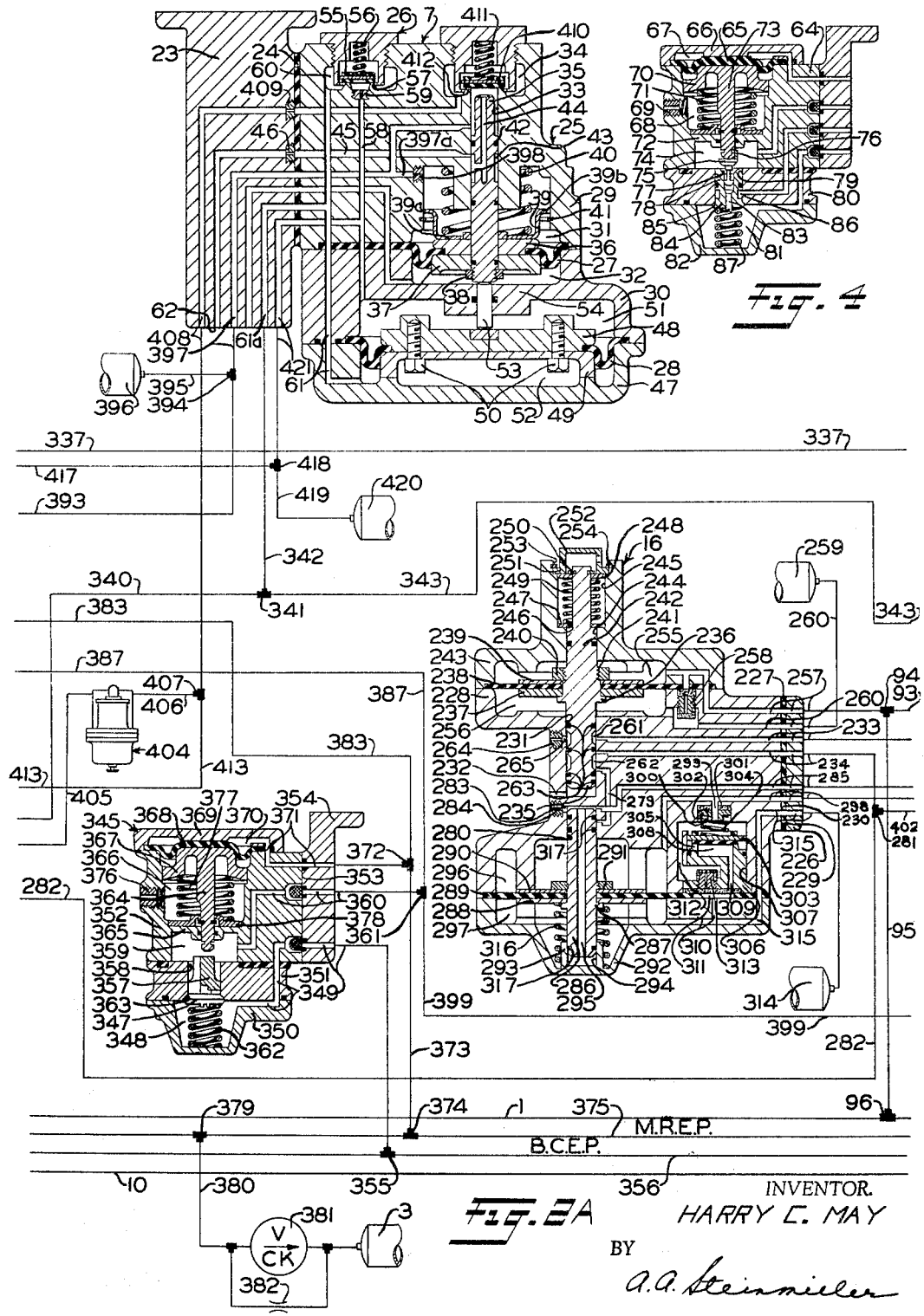

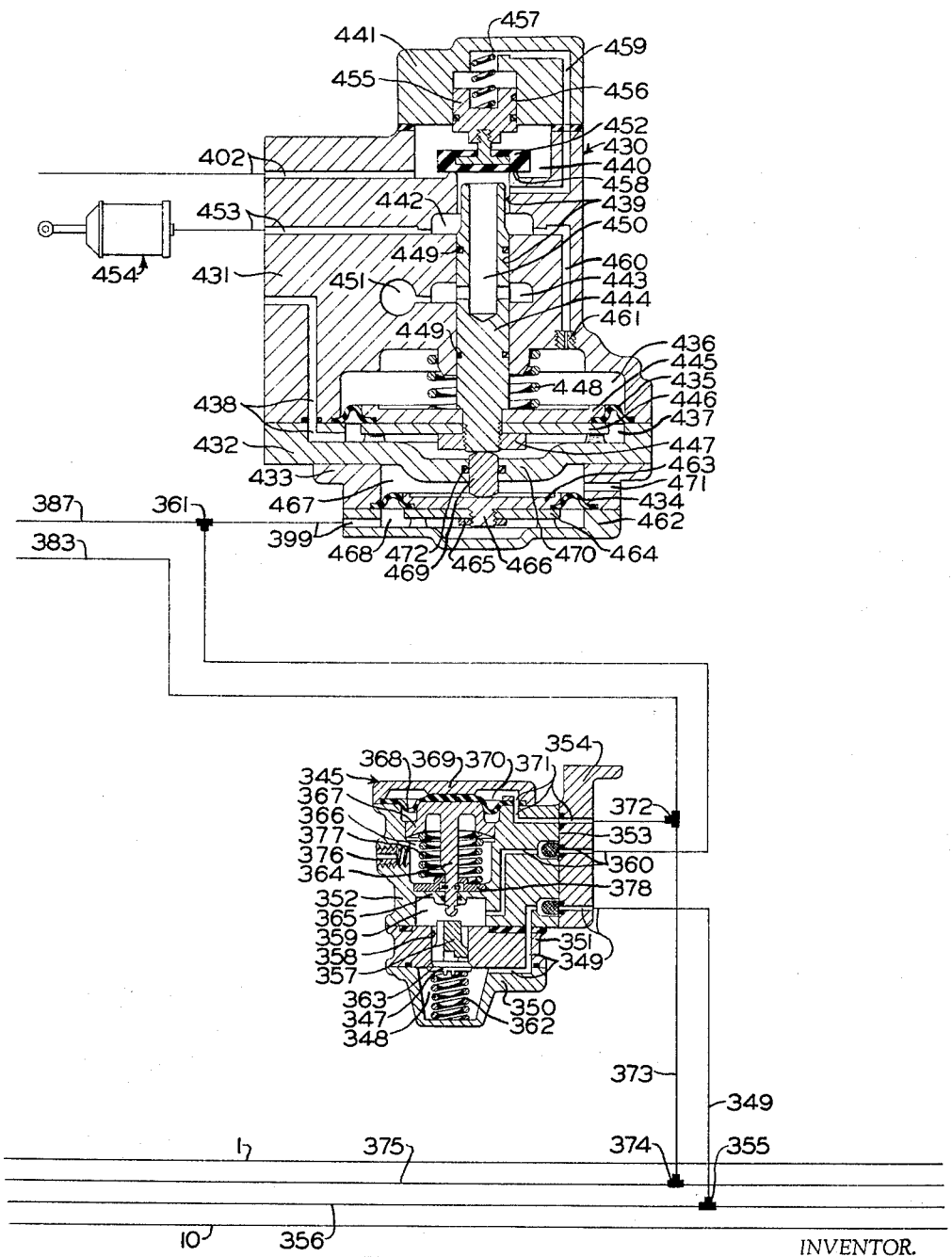

United States Patent Office 3,272,563
Patented Sept. 13, 1966

3,272,563
COMBINED FLUID PRESSURE AND VACUUM
VEHICLE BRAKE SYSTEM
Harry C. May, East McKeesport, Pa., assignor to Westinghouse Air Brake Company, Wilmerding, Pa., a corporation of Pennsylvania
Filed Mar. 26, 1965, Ser. No. 442,855
14 Claims. (Cl. 303—4)

This invention relates to combined compressed air and vacuum-operated brake equipment for multi-unit railway locomotives, and, more particularly, to a manually conditioned, automatically operative, multi-unit exhauster control apparatus by which the exhauster on the leading unit is under the manual control of the engineer and the exhausters on the trailing units are automatically controlled by the rate of increase in the pressure in a fluid pressure brake pipe extending through the several units of the multi-unit locomotive.

In apparatus of the above general type, it has heretofore been the practice to provide on each locomotive unit a cut-off valve device between a vacuum control valve device that controls a communication between a vacuum reservoir that is evacuated by an exhauster located on the respective locomotive unit and a vacuum brake pipe that extends through the train, which cut-off valve device on each trailing locomotive unit is manually placed in a cut-off position so that the vacuum brake pipe is evacuated by operation of only the exhauster located on the leading unit of the multi-unit locomotive. By thus using only the exhauster on the leading locomotive unit to effect evacuation of the entire vacuum brake pipe extending through the train, this single exhauster must operate at maximum capacity and, therefore, under a heavy load for a considerable period of time to effect a complete brake release on the entire train. Furthermore, should the exhauster on the leading unit fail or become inoperative, a shifting or rearrangement of the several locomotive units would be required in order that one of the former trailing units could be used as the leading unit and its exhauster operated to effect evacuation of the vacuum brake pipe. Therefore, it is apparent that the use of only the exhauster on the leading unit of a multi-unit locomotive to effect evacuation of the vacuum brake pipe extending throughout the train not only is time consuming and imposes a heavy load on the exhauster, but also requires a rearrangement of the several units should the exhauster on the leading unit become inoperative for any reason.

In Reissue Patent No. 26,022, issued May 10, 1966, to Harry C. May, and assigned to the assignee of the present application, there is shown and described apparatus for controlling the availability of the exhausters on the trailing units of a multi-unit locomotive, without the necessity of additional piping between the several locomotive units, by providing a novel, manually conditioned, automatically operative, multi-unit exhauster control apparatus to enable the engineer from the cab of the leading locomotive unit to effect automatic operation of the exhauster on each respective unit to assist in the evacuation of the vacuum brake pipe so long as the pressure in the fluid pressure brake pipe is increasing at a rate that is in excess of a chosen rate.

In the above-mentioned control apparatus, fluid under pressure is supplied to the fluid pressure brake pipe under the control of the engineer by manual operation of an engineer's brake valve device located on the leading unit of a multi-unit locomotive, and so long as the rate of increase in the pressure in the fluid pressure brake pipe exceeds a chosen rate, the exhauster control apparatus on each trailing locomotive unit is operable thereby to cause the exhauster on each respective trailing locomotive unit to be effective to assist the exhauster on the leading unit in evacuating a vacuum brake pipe extending through the train to release the train brakes.

The manually controlled, automatically operative, multi-unit exhauster control apparatus disclosed in the above-mentioned reissue patent operates, while the pressure in the fluid pressure brake pipe extending from end to end of the multi-unit locomotive is increasing at a rate that is in excess of a chosen rate, to establish a communication between that portion of the vacuum brake pipe on each locomotive unit and the exhauster located on the respective unit, whereby the exhauster on each unit is effective to assist the exhausters on the remaining units to evacuate the vacuum brake pipe to effect a brake release on the cars in the train.

Essentially, the present invention provides an improved, manually controlled, automatically operative, multi-unit exhauster control apparatus, wherein each unit of a multi-unit locomotive is provided with a fluid pressure operated valve device for controlling a communication between the vacuum brake pipe and the respective exhauster that is selectively operated to open the communication accordingly as the respective locomotive unit is a leading or a trailing unit by fluid under pressure supplied under the manual control of the engineer, or by fluid under pressure supplied from a main reservoir on the respective locomotive by a brake pipe pressure operated valve device that is operative to effect this supply so long as the pressure in a fluid pressure brake pipe is increasing at a rate greater than a chosen rate. This brake pipe pressure operated valve device is further operable, subsequent to the fluid pressure brake pipe becoming fully charged, to control, at a chosen rate, the release of the fluid under pressure supplied from the main reservoir to the fluid pressure operated valve device. This brake pipe pressure operated valve device also includes valve means responsive to an increase in a subatmospheric pressure in a vacuum brake pipe only while the pressure in the fluid pressure brake pipe remains constant, to effect the supply of fluid under pressure from the main reservoir to cause operation of an indicating device and a brake application valve device.

The present invention further includes a second fluid pressure operated valve device arranged in series with the above-mentioned first fluid pressure brake pipe operated valve device in the communication extending between the vacuum brake pipe and the respective exhauster and operable in response to variations in the pressure in the fluid pressure brake pipe. This second fluid pressure operated valve device is simple in design and less expensive to manufacture than valve devices heretofore used for regulating the degree of subatmospheric pressure in the train vacuum brake pipe. Furthermore, this second valve device embodies means for always maintaining at least a restricted communication between atmosphere and the exhauster, which restricted communication is effective to prevent an undesired decrease in the subatmospheric pressure in the train vacuum brake pipe to a value less than a chosen desired value. This constantly maintained restricted communication between atmosphere and the exhauster is also effective to reduce the normal operating temperature of the exhauster, and the tendency for the lubricating oil in the exhauster crankcase chamber to pass therefrom past the rings on the exhauster piston into the exhausting chamber.

In the accompanying drawings:
FIG. 1 is a diagrammatic view of a multi-unit locomotive, each unit of which is equipped with cast iron brake shoes.
FIG. 2, FIG. 2A, and FIG. 2B, when taken together such that the right-hand edge of FIG. 2 is matched with the left-hand edge of FIG. 2A, and the right-hand edge of FIG. 2A is matched with the left-hand edge of FIG. 2B, constitutes a diagrammatic view of a combined automatic compressed air and vacuum-operated locomotive brake equipment for one unit of the multi-unit locomotive shown in FIG. 1 equipped with cast iron brake shoes and embodying the invention which comprises a novel exhauster control apparatus for controlling the operation of the respective exhauster on the one unit of a multi-unit locomotive.

FIG. 3 is a diagrammatic development view showing port connections established in lead and trail positions of a change-over valve device shown in FIG. 2.

FIG. 4 is a diagrammatic view on an enlarged scale of a fluid pressure operated valve device, two of which are shown in outline in FIG. 2 and are included in the diagrammatic view of the combined automatic compressed air and vacuum-operated locomotive brake equipment shown in FIGS. 2, 2A, and 2B, which equipment constitutes the present invention.

FIG. 5 is a partial diagrammatic view of a combined automatic compressed air and vacuum-operated locomotive brake equipment for one unit of a multi-unit locomotive, which unit is equipped with composition brake shoes, it being understood that the remainder of the equipment for this one unit is identical to the corresponding equipment shown in FIGS. 2, 2A, and 2B of the drawings.

Description

Figure 2B:
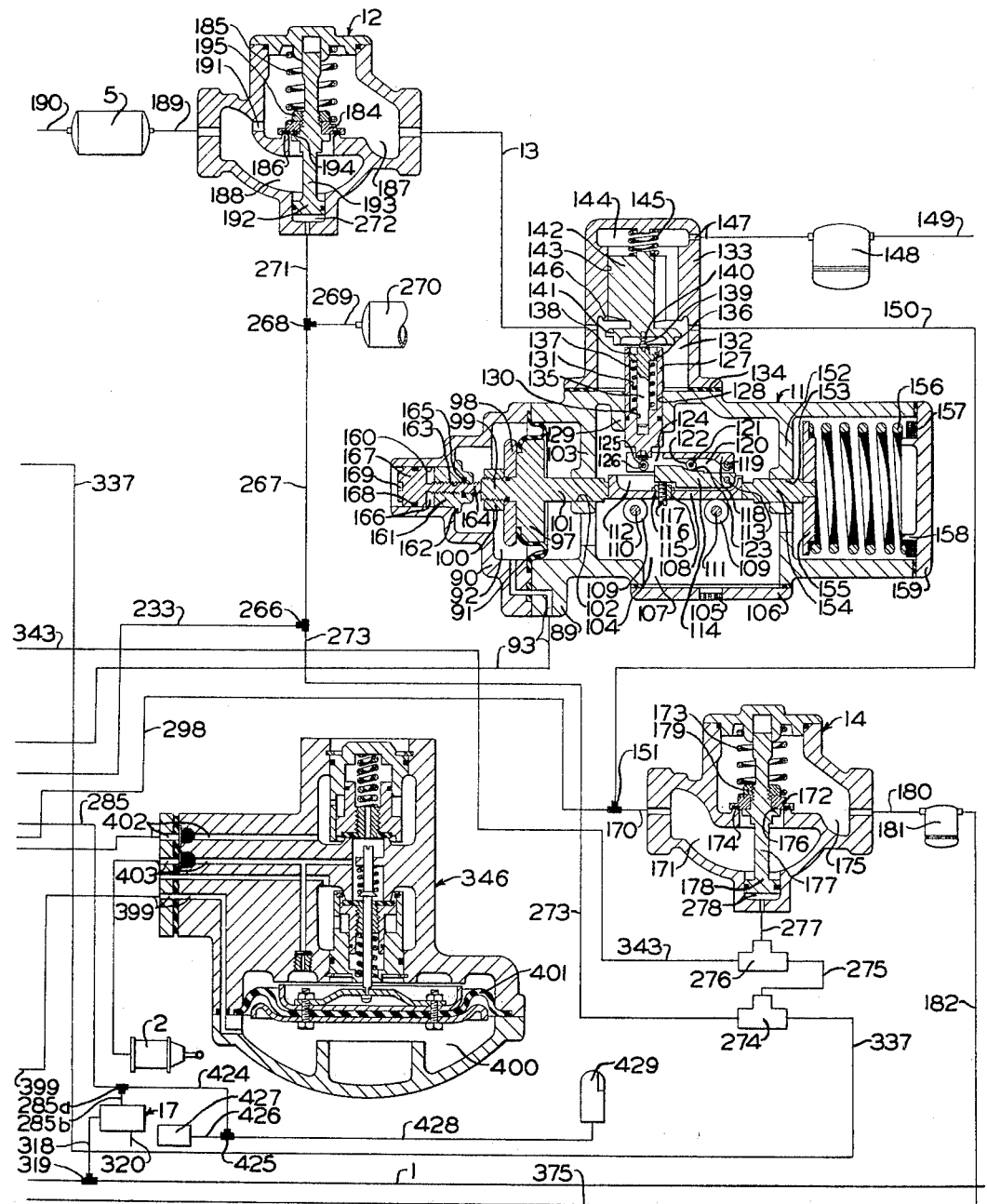

Referring to FIG. 1 of the drawings, the combined automatic compressed air and vacuum-operated locomotive brake equipment described herein is applicable to a multi-unit locomotive illustratively shown as comprising a leading unit, hereinafter called unit A, and two trailing units, hereinafter called unit B and unit C, each of which units it may be assumed is equipped with cast iron brake shoes. Each of the locomotive units A, B, and C is provided with identical combined automatic compressed air and vacuum-operated locomotive brake equipment as shown in FIGS. 2, 2A and 2B.

Referring to these drawings, the combined automatic compressed air and vacuum-operated locomotive brake equipment for one unit of a multi-unit locomotive comprises a fluid pressure brake pipe 1 that extends from end to end of each unit of a multi-unit locomotive, a brake cylinder device 2, a first main reservoir 3, a second main reservoir 4, a vacuum reservoir 5, an engineer's automatic brake valve device 6 for controlling the pressure in the fluid pressure brake pipe 1, a brake control valve device 7 connected in series through a fluid pressure brake pipe operated cut-out valve device 8 and a combined cut-out cock and strainer device 9 to a vacuum brake pipe 10 that extends from the locomotive back through each car in a train, and controlled by variations in pressure in the vacuum brake pipe 10, a vacuum control valve device 11 for controlling pressure in the vacuum brake pipe 10 according to variations in the pressure in the fluid pressure brake pipe 1, such that vacuum controlled brakes on the connected cars of a train will be applied and released responsively to respective increases and decreases in pressure in the vacuum brake pipe 10 in the well-known manner, a quick release valve device 12 for controlling a large capacity flow communication between a vacuum source, such as the vacuum reservoir 5, and a pipe 13 leading to the vacuum control valve device 11, a fluid pressure operated vacuum brake release valve device 14 for controlling a large capacity flow communication between the vacuum control valve device 11 and the vacuum brake pipe 10 to which valve device 14 fluid under pressure is supplied selectively accordingly as whether the locomotive unit is respectively a leading or a trailing unit, by a manually operated change-over valve device 15 located in the cab of the locomotive or by a charging and break-in-two indication valve device 16 automatically responsive to an increase in the pressure in fluid pressure brake pipe 1 at a rate in excess of a chosen rate, and a fluid pressure operated emergency relay valve device 17 of well-known construction to which fluid under pressure is supplied by operation of the charging and break-in-two indication valve device 16 in response to rupture of the vacuum brake pipe 10. The fluid pressure operated emergency relay valve device 17 is operable in response to the fluid under pressure supplied thereto by the charging and break-in-two indication valve device 16 to effect a reduction at an emergency rate of the pressure in the fluid pressure brake pipe 1 connected thereto, which emergency rate of reduction effects an emergency application of both the locomotive and car brakes, in the manner hereinafter described in detail.

The engineer's automatic brake valve device 6 is a self-lapping type of valve device having a self-lapping unit of any well-known construction which, while a brake valve handle 18 occupies a "Release" position, will be actuated to supply fluid under pressure from the second main reservoir 4 that is connected to the brake valve device 6 by a pipe 19 having therein a pipe cross 20 and a pipe T 21, to a pipe 22 that is connected via the change-over valve device 15, in a manner hereinafter explained in detail, to the fluid pressure brake pipe 1 so that fluid under pressure is supplied to the fluid pressure brake pipe 1 at a pressure corresponding to a preselected normal charged value.

The handle 18 of the engineer's automatic brake valve device 6 has five positions, namely, "Release," "Minimum Reduction," "Full Service," "Overreduction" and "Emergency." Extending between the "Release" and "Full Service" positions is a service zone so that as the engineer moves the handle 18 arcuately from its "Release" position into the service zone an extent corresponding to the degree of service brake application desired, fluid under pressure will be exhausted from the fluid pressure brake pipe 1 proportional to the amount of arcuate movement of the handle 18 into this zone, thus providing a graduated application of the brakes on the locomotive.

A graduated release of the locomotive brakes can be effected by the engineer moving the handle 18 of the brake valve device 6 from whatever position it occupies in the service zone in the direction of its "Release" position to a selected position in the service zone corresponding to the higher degree of pressure desired in the fluid pressure brake pipe 1 and, therefore, to the reduction in pressure to be effected in the brake cylinder device 2.

A complete release of the locomotive brakes can be effected by the engineer moving the handle 18 of the brake valve device 6 from whatever position it occupies in the service zone in the direction of its "Release" position back to this position.

When the handle 18 is moved through an overreduction zone extending between "Full Service" position and "Overreduction" position, an additional reduction in brake pipe pressure will be effected, which, for example, may be a total resultant reduction of pressure in the fluid pressure brake pipe 1 of approximately thirty-six to thirty-eight pounds per square inch, upon the handle 18 reaching its "Overreduction" position.

In addition to a self-lapping unit, the engineer's automatic brake valve device 6 further comprises a vent valve device which is opened by the engineer moving the handle 18 to its "Emergency" position to effect a reduction in the pressure in the fluid pressure brake pipe 1 at an emergency rate to cause an emergency application of the locomotive and train brakes. A release of the locomotive and train brakes, subsequent to an emergency application, can be effected by the engineer moving the handle 18 from its "Emergency" position back to its "Release" position.

The brake control valve device 7 comprises a pipe bracket 23 having a face 24 on which is mounted a service valve device 25, the structure of which may be substantially the same as that of the service valve device 8 shown in FIG. 1B of United States Patent No. 3,018,138, issued January 23, 1962, to Richard L. Wilson and William B. Jeffery, and assigned to the assignee of the present application, except for the addition of a check valve device 26, the purpose of which is hereinafter made apparent.

Briefly, the service valve device 25 preferably comprises two coaxially arranged movable abutments or diaphragms 27 and 29 of different effective areas cooperatively, though not positively, connected so as to constitute a stack, as will be understood from subsequent description. The outer periphery of the smaller diaphragm 27 is clamped between two casing sections 29 and 30 comprising a sectionalized casing of the service valve device 25. These casing sections are secured together by any suitable means (not shown).

The diaphragm 27 cooperates with the casing sections 29 and 30 to form within the service valve device 25 and on opposite sides of the diaphragm a first pair of chambers 31 and 32, the latter being opened to atmosphere.

The casing section 29 of the service valve device 25 is provided with a bore 33 which opens at one end into a chamber 34 adjacent the upper end of the casing section 29 and opens at the other end into the chamber 31. Slidably mounted in the bore 33 is a valve stem 35, the lower end of which extends through two diaphragm followers 36 and 37 disposed on the opposite sides of the diaphragm 27 and is screw threaded to receive a nut 38 which has screw-threaded engagement with the end of the valve stem 35 to operatively connect the center of the diaphragm 27 to the diaphragm followers 36 and 37 and to the valve stem 35. Resting against the upper side of the diaphragm follower 36 is a cup-shaped spring seat 39 having an inturned annular flange 39a at one end and an outturned annular flange 39b at the other end. Disposed within the chamber 31 between the casing section 29 and the inturned annular flange 39a on the spring seat 39 and in surrounding relation to the stem 35 is a spring 40 for biasing the valve stem 35 and the diaphragm 27 in a downward direction. The spring 40 and the spring seat 39 are retained in the chamber 31 by means of a snap ring 41 that is inserted in a groove formed in the casing section 29.

The valve stem 35 is provided with three identical spaced-apart peripheral annular grooves in each of which is disposed an O-ring 42 to prevent leakage of fluid under pressure between the periphery of the valve stem and the wall of bore 33 and between the chambers 31 and 32. The valve stem 35 is provided intermediate its ends with a peripheral annular groove 43 which, as shown in FIG. 2A illustrating the relative positions of the parts of the serviec valve device 25 in the brake release position, is so located that the upper end of the bore 33 is opened to atmosphere via a passageway 44 extending from the upper end of the valve stem 35 longitudinally therethrough to the location thereon at which the peripheral annular groove is formed, thence crosswise the valve stem 35 so as to open onto the groove 43, and thence via a passageway 45 extending through the casing section 29 and the pipe bracket 23 and having therein a brake cylinder exhaust control choke 46 which is carried in the pipe bracket 23.

The outer periphery of the larger diaphragm 28 is clamped between the casing section 30 and a cover 47 which is secured to the casing section 30 by any suitable means (not shown). The center of the larger diaphragm 28 is clamped between two diaphragm followers 48 and 49 which are secured together by a plurality of cap screws 50 that pass through corresponding smooth bores in the diaphragm follower 49 and have screw-threaded engagement with coaxial threaded bores in the diaphragm follower 48. The larger diaphragm 28 cooperates with the casing section 30 and the cover 47 to form within the service valve device 25 and on opposite sides of the diaphragm 28 a second pair of chambers 51 and 52. A cylindrical pusher stem 53 arranged coaxially with the movable abutments 27 and 28 has sealing, slidably guided contact with the wall of an aligned bore through a casing partition 54 separating the chamber 51 from the chamber 32, the ends of the pusher stem 53 abuttingly contacting, respectively, the lower end of the valve stem 35 and the upper side of the diaphragm follower 48.

The hereinbefore-mentioned check valve device 26 comprises a flat disc-type valve 55 that is normally urged by a light biasing spring 56 into seating contact with an annular valve seat 57 formed adjacent one end of a passageway 58 in the casing section 29, the opposite end of which passageway 58 opens into the chamber 51 above the larger diaphragm 28. Disposed in the passageway 58 is a choke 59 to control the rate of one-way flow of fluid under pressure from the chamber 51, upon unseating of the flat disc check valve 55 from the annular valve seat 57, to an outlet chamber 60. The outlet chamber 60 is in constant communication with the chamber 52 below the large diaphragm 28 by way of a passageway 61 extending from the chamber 60 through the casing sections 29 and 30 and the cover 47. A branch passageway 61a extends through the casing section 29 and the pipe bracket 23 and opens at a flat face 62 formed on the lower side of the pipe bracket 23.

The fluid pressure brake pipe operated cut-off valve device 8, shown in outline in FIG. 2, and a break-in-two protection valve device 63, also shown in outline in FIG. 2, are identical in combination. Therefore, a description of one will suffice for both. Such a valve device is shown in cross-section in FIG. 4 of the drawings and comprises a casing section 64 containing a diaphragm 65 clamped about its periphery between the casing section 64 and a cover 66, and defining with the cover a control chamber 67. At the other side of the diaphragm 65 is a spring chamber 68 which is open to atmosphere through a choke fitting 69 which has screw-threaded engagement with a screw-threaded bore extending through the casing section 64. Contained in chamber 68 is a diaphragm follower 70 which is held in operative contact with the diaphragm 65 by a spring 71 interposed between the follower 70 and a partition wall 72 of the chamber 68. Follower 70 has a stem 73 that extends through a central opening in the partition wall 72.

A chamber 74 is formed in the casing section 64 at the side of partition wall 72 opposite the chamber 68 and contains a valve 75 that is linked by means of a forked connection 76 to the lower end of follower stem 73, as viewed in FIG. 4 of the drawings. The valve 75 is adapted to make seating contact with a valve seat 77 formed on the upper end of a cylindrical valve member 78 which is slidably mounted in a bore 79 formed in a casing section 80 which is secured to the casing section 64 by any suitable means (not shown). The bore 79 in the casing section 80 extends from the chamber 74 to a chamber 81 formed in another casing section 82 secured to the casing section 88 by any suitable means (not shown).

The cylindrical valve member 78 is provided with a through bore 83 encircled at its upper end by the valve seat 77 and at its lower end by a conical or poppet-type valve 84, which valve is arranged for cooperation with a valve seat 85, formed on the casing section 80 at the lower end of bore 79, to control communication between chamber 81 and a chamber 86 defined by the wall of the bore 79 and a reduced portion of the cylindrical valve member 78. A spring 87 disposed in chamber 81 constantly urges the valve member 78 upwardly to a position in which communication between the chambers 74 and 81 is open via bore 83 and communication between chambers 81 and 86 is closed, as shown in FIG. 4 of the drawings.

The combined cut-out cock and strainer device 9, shown in FIG. 2, is provided with a cock key (not shown) that may be manually rotated by a handle 88 from an open position to a closed or cut-off position. The strainer device (not shown) contained in the combined cut-out cock and strainer device 9 is described and claimed in Patent No. 2,014,895, issued September 17, 1935, to Ellis E. Hewitt, which patent is assigned to the assignee of the present application.

The vacuum control valve device 11 (FIG. 2B) is provided for the purpose of varying the pressure in the vacuum train pipe 10 in accordance with the variations in pressure in the fluid pressure brake pipe 1 to thereby control the brakes on the cars of a train in accordance with the operation of the engineer's brake valve device 6 to control the fluid pressure brakes on the locomotive.

The vacuum control valve device 11 (FIG. 2B) comprises a casing 89 between the left-hand end of which and a cover member 90 is clamped the outer periphery of a movable abutment or diaphragm 91 which, in cooperation with the cover member 90, defines at one side of the diaphragm a control chamber 92. The control chamber 92 is connected to the fluid pressure brake pipe 1 via a passageway and corresponding pipe 93 that is connected to one end of a pipe T 94 (FIG. 2A), the side outlet of which is connected by a pipe 95 to the side outlet of a second pipe T 96 that is disposed in the fluid pressure brake pipe 1, as shown in FIG. 2A. The inner edge of the diaphragm 91 is clamped between a diaphragm follower 97 and an annular diaphragm follower plate 98 through which extends a screw-threaded stem 99 that is formed integral with the diaphragm follower 97 and which receives a nut 100 for forcing the follower plate 98 against the follower 97.

Formed integral with the right-hand side of the diaphragm follower 97 is an operating stem 101 that extends through a bore 102 in a boss 103 that is integral with the upper wall of the casing 89 and extends downward therefrom into a chamber 104 within the casing. The chamber 104 is open to the atmosphere through an insect excluder device 105 carried by a bottom cover 106 that is secured to the bottom wall of the casing 89 by any suitable means (not shown) to close an opening 107 in this bottom wall. Disposed in the chamber 104 coaxial with the operating stem 101 is a cam carrier 108 that is supported by a pair of spaced-apart identical rollers 109 which are respectively rotatably mounted on a pair of parallel spaced-apart shafts 110 and 111 that have their respective opposite ends anchored in opposite vertical walls of the casing 89.

The cam carrier 108 is rectangular in shape and has a recess 112 formed in its upper face as by a milling operation. The width of the recess 112 is less than the width of the cam carrier 108 so that the milling operation forms two upstanding parallel spaced-apart walls in which are anchored the opposite ends of a pin 113 on which is pivotally mounted adjacent one end thereof a cam element 114. Extending through the cam carrier 108 and opening into the recess 112 is a bore 115 into which is press-fitted a bushing 116 that has a screw-threaded bore in which is carried an adjusting screw 117 that supports the left-hand end of the cam element 114.

Disposed above the cam element 114 is a cam lever 118 which is pivotally mounted adjacent its right-hand end on a pin 119 that has its opposite ends anchored in the opposite vertical walls of the casing 89. The cam lever 118 is also rectangular in shape and has a recess 120 formed in its lower face which extends inward from its left-hand end and terminates adjacent the pin 119 on which the cam lever is pivotally mounted. The width of the recess 120 is less than the width of the cam lever 118 so that when the recess 120 is formed in the cam lever 118, as by a milling operation, the cam lever will be provided with two downwardly extending parallel spaced-apart walls in which are anchored the opposite ends of a first pin 121 on which is rotatably mounted a roller 122 that is adapted to roll along a cam surface 123 formed on the cam element 114 as this cam element is moved in either a right-hand or a left-hand direction from the position in which it is shown in FIG. 2B, in a manner hereinafter described in detail.

The cam lever 118 is provided with a short slot 124 which extends inward from the left-hand end thereof, the width of which is substantially the same as the distance between the two downwardly extending parallel spaced-apart walls at the opposite sides of the recess 120. Anchored in these two downwardly extending walls at a location that is substantially midway the length of the slot 124 is a second pin 125 on which is rotatably mounted a roller 126 upon which rests the lower end of a pusher sleeve 127 that extends through a bore 128 formed in a boss 129 that is integral with the upper wall of the casing 89 and extends downward therefrom into the chamber 104.

The pusher sleeve 127 is provided with a bottom bore 130 and a coaxial counterbore 131 that extend inward from the upper end thereof, which upper end is disposed in a chamber 132 that is formed in a valve body or housing 133 that is secured by any suitable means (not shown) to an exterior flat surface 134 formed on the upper wall of the casing 89.

Slidably mounted in the bottom bore 130 is the lower end of a valve pusher 135 that has a collar 136 formed at the upper end thereof and disposed in the counterbore 131. Interposed between the collar 136 and the bottom of the counterbore 131 and in surrounding relation to the valve pusher 135 is a spring 137 that is effective to normally bias the collar 136 against a snap ring 138 that is inserted in a groove formed in the wall of the counterbore 131 adjacent the upper end thereof.

The upper end of the valve pusher 135 is provided with a headed wear pin 139 the head of which abuts a corresponding head formed at the lower end of a valve tip 140 that is carried by a poppet-type valve 141 having a fluted stem 142 that is disposed in a bore 143 formed in the valve housing 133 and extending between the chamber 132 and a chamber 144 formed in the upper end of the valve housing 133.

Disposed in the chamber 144 and interposed between the valve housing 133 and the upper end of the fluted stem 142 is a spring 145 that is effective to bias the valve tip 140 into contact with the head of the headed pin 139 and the valve 141 in a direction away from an annular valve seat 146 formed at the lower end of the bore 143.

Opening into the chamber 144 is one end of a passageway 147 the opposite end of which is connected by a pipe bearing the same numeral to the outlet of an atmospheric air filter device 148 to the inlet of which is connected one end of a pipe 149 the opposite end of which is open to atmosphere. While the valve 141 is held unseated by the spring 145, the filter device 148 serves to remove contaminants from atmospheric air admitted to the chamber 132 into which opens one end of the pipe 13 and also one end of a pipe 150 that has its opposite end connected to the side outlet of a pipe T 151.

The upper wall of the casing 89 has formed integral therewith a second boss 152 that extends downward therefrom, which boss is provided with a bore 153 that is coaxial with the bore 102 in the boss 103. Slidably mounted in the bore 153 is a carriage pusher 154 one end of which abuts the right-hand end of the cam carrier 108 and the opposite end of which is secured to a spring seat 155. A heavy spring 156 is interposed between the spring seat 155 and a plurality of annular shims 157 arranged in a stack in surrounding relation to a boss 158 formed on the left-hand side of a cover member 159 that is secured to the right-hand open end of the casing 89 by any suitable means (not shown).

In order to initially properly position the cam element 114 which is pivotally mounted on the movable cam carrier 108, with respect to the cam lever 118 which is pivotally mounted on the pin 119, the opposite ends of which are anchored in the opposite vertical walls of the stationary casing 89, the cover 90 is provided with a bore 160 into the right-hand end of which is press-fitted a bushing 161 having intermediate its ends a collar 162 which rests against the cover 90 at the right-hand end of the bore 160.

The bushing 161 is provided with a central internal screw-threaded bore 163 for receiving an adjusting screw 164 the right-hand end of which abuts the left-hand end of the screw-threaded stem 99 that is integral with the diaphragm follower 97. Intermediate its ends the central internal screw-threaded bore 163 is provided with an annular groove in which is inserted an O-ring 165 that forms a seal with adjusting screw 164 to prevent leakage of fluid under pressure from the control chamber 92 along the adjusting screw 164 to a chamber 166 formed by the cooperative relation of the bushing 161, the wall of the bore 160 and a cylindrical head 167 formed integral with the adjusting screw 164. The cylindrical head 167 is provided with a peripheral annular groove in which is inserted an O-ring 168 that forms a seal with the wall surface of the bore 160 to prevent leakage of fluid under pressure from the chamber 166 to atmosphere.

The cylindrical head 167 is further provided with a screw-driver slot 169 for receiving the end of a screw driver the rotation of which in one direction is effective to move the cam carrier 108 and cam element 114 via the stems 99 and 101 that are integral with the diaphragm follower 97 in the direction of the right hand against the yielding resistance of the heavy spring 156 until a reference mark (not shown) formed on the cam element 114 is in alignment with a corresponding reference mark (not shown) formed on the cam lever 118. It will be understood from the foregoing that rotation of the screw driver in the opposite direction so that the adjusting screw 164 is moved away from the screw-threaded stem 99 renders the heavy spring 156 effective to move the cam carrier 108 and cam element 114 via the carriage pusher 154 in the direction of the left hand so that the left-hand end of the stem 99 is maintained in contact with the right-hand end of the adjusting screw 164. Thus, if when initially assembled, the reference mark formed on the cam element 114 is either on the left-hand side or on the right-hand side of the reference mark on the cam lever 118, the cam carrier 108 and cam element 114 carried thereby can be moved in the proper direction to bring the reference mark on the cam element 114 into alignment with the corresponding reference mark on the cam lever 118.

It should be noted at this time that the number of shims 157 interposed between the right-hand end of the heavy spring 156 and the cover member 159 must be such that, when the cam carrier 108 is adjusted to the position that the reference mark on the cam element 114 carried thereby is in alignment with the reference mark on cam lever 118, the caged value of the heavy spring 156 is equal to the effective area of the diaphragm 91 in square inches multiplied by fifty pounds per square inch, since it is desired that the vacuum control valve device 11 control variations in the subatmospheric pressure in the vacuum brake pipe 10 from zero inches of mercury (atmospheric pressure) to twenty inches of mercury accordingly as the pressure in the fluid pressure brake pipe 1 is varied from fifty pounds per square inch to seventy pounds per square inch, it being understood that while the diaphragm 91, cam carrier 108, and cam lever 118 occupy the position shown in FIG. 2B, the valve 141 is biased away from the annular valve seat 146 by the spring 145 to its fully open position so that atmospheric air admitted through the filter device 148 will increase the subatmospheric pressure in the vacuum brake pipe 10 to atmospheric pressure since the other end of the hereinbefore-mentioned pipe T 151 is connected to the vacuum brake pipe 10, in a manner which will now be described in detail.

The right-hand end of the hereinbefore-mentioned pipe T 151 is connected by a short pipe 170 to a first chamber 171 in the fluid pressure operated vacuum brake release valve device 14 which further comprises a disc-shaped valve 172 normally biased by a spring 173 into contact with an annular valve seat 174 to close communication between the chamber 171 and a second chamber 175 within the vacuum brake release valve device 14. The disc-shaped valve 172 is secured against a shoulder 176 formed on a piston rod 177 of a piston 178 by a nut 179. The chamber 175 is connected by a short pipe 180 to the outlet of a filter device 181 the inlet of which is connected by a pipe 182 to the side outlet of a pipe T 183 that is disposed in the vacuum brake pipe 10.

The quick release valve device 12 may be substantially the same as that disclosed in U.S. Patent No. 2,822,220, issued February 4, 1958, to Harry C. May, and assigned to the assignee of the present application, and in view of this it is deemed unnecessary to described this device in detail. Briefly, however, the quick release valve device 12 comprises a disc-shaped valve 184 normally biased by a spring 185 into contact with an annular valve seat 186 for preventing large capacity flow between a chamber 187 to which one end of the pipe 13 is connected and a chamber 188 that is connected via a pipe 189 to the vacuum reservoir 5, which reservoir is connected via a pipe 190 to a vacuum exhauster (not shown). An orifice 191 permits limited flow between the chambers 187 and 188 in bypass of the disc-shaped valve 184 for permitting vacuum in the vacuum brake pipe 10 to be maintained against normal leakage, as will hereinafter be explained in detail, while the disc-shaped valve 184 is seated. The orifice 191 is of such size as to allow the exhauster to exhaust all of the atmospheric air admitted past the valve 141 subsequent to the pressure in the chamber 92 of the vacuum control valve device 11 being reduced to fifty pounds per square inch, which pressure corresponds to a full service brake application.

The disc-shaped valve 184 is adapted to be moved out of seating contact with the annular valve seat 186 by a coaxially arranged piston 192 having a piston rod 193 that extends through the annular valve seat 186 and has a shoulder 194 thereon against which the disc-shaped valve 184 is clamped by a nut 195 having screw-threaded engagement with screw threads formed on the piston rod 193 intermediate the ends thereof.

The manually operated change-over valve device 15 (FIG. 2), which is located in the cab of the locomotive so that the engineer has easy access thereto, comprises a pipe bracket 196 that is provided on its upper side with a flat face 197 to which is secured by any suitable means (not shown) a body 198 having on its lower side a flat face 199 between which and the flat face 197 is disposed a gasket 200.

Extending from the lower side of the pipe bracket 196 through the pipe bracket, the gasket 200 and body 198, and opening at the wall surface of a bore 201 in the body 198, the right-hand end of which is closed by a plug 202, are seven passageways 203, 204, 205, 206, 207, 208, and 209, which passageways are connected by pipes, as hereinafter described in detail, to various devices that comprise the brake equipment on one unit of a multi-unit locomotive.

The manually operated change-over valve device 15 further comprises a spool-type selector valve 210 that is sealingly slidable in the bore 201 in the body 198 and exposed at both ends to atmospheric pressure via a longitudinal atmospheric passageway 211 in the spool-type selector valve 210 and a port 212 in the body 198 near the left-hand end of the bore 201. The spool-type selector valve 210 has adjacent its left-hand end a transversely extending notch into which extends a dog 213 that is eccentrically carried by a rotatable member 214 that is rotatably mounted in a bore 215 in the body 198. The spool-type selector valve 210 can be shifted axially in the bore 201 to either one of two positions, hereinafter defined, by rotation of the rotatable member 214 by means of a handle 216 which must be first pushed downward against the force of a bias spring 217 to disengage or unlock a pin 218 from a position-defining notch formed on the bottom side of a cover member 219 that closes the upper end of the bore 215 in the body 198. The bottom side of the cover member 219 is provided with a second position-defining notch into which the pin 218 is biased by the spring 217 upon release of the handle 216 subsequent to rotation thereof to effect shifting of the spool-type selector valve 210 from one of its two positions to the other.

Intermediate its ends the spool-type selector valve 210 has three axially spaced-apart peripheral annular grooves 220, 221, and 222 and a restricted radial port 223 that extends from the central passageway 211 in the spool-type selector valve 210 to the periphery thereof and, while the selector valve 210 occupies the position in which it is shown in FIG. 2A, registers with the passageway 205 that extends through the body 198 and pipe bracket 196 and is closed by a blanking pad 224 secured to the bottom face of the pipe bracket. The peripheral annular grooves 220, 221 and 222 and the restricted radial port 223 are sealingly separated one from another by a plurality of O-rings 225 each carried in one of a plurality of spaced-apart peripheral annular grooves provided in the spool-type selector valve 210. While the spool-type selector valve 210 occupies the position in which it is shown in FIG. 2, the peripheral annular groove 220 thereon connects the passageways 203 and 204, the restricted radial port 223 connects the passageway 205 to atmosphere via central passageway 211 and port 212, the peripheral annular groove 221 connects the passageways 206 and 207, and the peripheral annular groove 222 connects the passageways 208 and 209.

The charging and break-in-two indication valve device 16 (FIG. 2A) comprises a pipe bracket 226 that is provided on its left-hand side with a vertical flat face 227 to which is secured by any suitable means (not shown) a body 228 having on its right-hand side a vertical flat face 229 between which and the vertical flat face 227 is disposed a gasket 230.

Extending from the right-hand side of the pipe bracket 226 through the pipe bracket, the gasket 230 and the body 228, and opening at the wall surface of a counterbore 231 in the body 228, the lower end of which counterbore is open to atmosphere via a short passageway 232 in the body 228, are two passageways 233 and 234, which passageways are connected by pipes, as hereinafter described in detail, to various devices that comprise the brake equipment on one unit of a multi-unit locomotive.

The charging and break-in-two indication valve device 16 further comprises a spool-type charging valve 235 that is sealingly slidable in the counterbore 231 and intermediate its ends is provided with a collar 236 against which rests a diaphragm follower 237. The center of a flat-type diaphragm 238 is clamped between the diaphragm follower 237 and a diaphragm follower plate 239 by a nut 240 that has screw-threaded engagement with a threaded portion 241 of a stem 242 that is integral with the spool-type charging valve 235.

The outer periphery of the flat-type diaphragm 238 is clamped between the upper end of the body 228 and a cover member 243 that is secured to the body 228 by any suitable means (not shown) and is provided with a bore 244 and a coaxial counterbore 245 into which the stem 242 extends.

The upper end portion of the stem 242 is of a reduced diameter so as to form a shoulder 246 against which rests a first annular plate 247 between which and a second annular plate 248 and in surrounding relation to the reduced diameter portion of the stem 242 is a spring 249 that is effective to bias the annular plate 248 in the direction of a snap ring 250 that is inserted in a groove formed in the stem 242 adjacent the upper end thereof. The spring 249 is also effective to bias the annular plate 248 in the direction of an outturned annular flange 251 that is formed on a cup-shaped member 252 and is retained in a counterbore 253 in the cover member 243 by a snap ring 254 that is inserted in a groove formed in the counterbore 253 which is coaxial with the counterbore 245.

The above-described construction provides for caging the spring 249 so that it will yieldingly resist movement of the spool-type charging valve 235 in either direction from the position in which it is shown in FIG. 2A.

The flat-type diaphragm 238 cooperates with the body 228 and the cover member 243 to form within the charging and break-in-two indication valve device 16 and on the opposite sides of the diaphragm 238 a pair of chambers 255 and 256. The chamber 255 is connected by a passageway 257 that extends through the cover member 243, the body 228 and the pipe bracket 226 and a pipe bearing the same numeral to the left-hand end of the hereinbefore-mentioned pipe T 94 the side outlet of which is connected by the pipe 95 to the pipe T 96 disposed in the fluid pressure brake pipe 1. Consequently, the pressure in the chamber 255 will vary in accordance with variations in the pressure in the fluid pressure brake pipe 1 and normally is charged to the pressure carried in the fluid pressure brake pipe 1.

The chamber 256 below the flat-type diaphragm 238 is connected to the passageway and corresponding pipe 257 through a screw-threaded charging choke plug 258 that is carried in a screw-threaded bore formed in the body 228, and to a volume reservoir 259 via a passageway 260 extending through the body 239 and pipe bracket 226 and a pipe bearing the same numeral. Consequently, the chamber 256 and the volume reservoir 259 are charged from the fluid pressure brake pipe 1 at a rate controlled by the size of the choke plug 258.

Intermediate the collar 236 thereon and the lower end thereof the spool-type charging valve 235 has two axially spaced-apart peripheral annular grooves 261 and 262. The peripheral annular grooves 261 and 262 are sealingly separated one from another and, respectively, from the chamber 256 and the lower end of the counterbore 231 by a plurality of O-rings 263 each carried in one of a plurality of spaced-apart peripheral annular grooves provided in the spool-type charging valve 235. While the spool-type charging valve 235 occupies the position in which it is shown in FIG. 2A, the peripheral annular groove 261 thereon connects the passageway 233 in the body 228 to atmosphere via a screw-threaded choke plug 264 carried in a corresponding screw-threaded bore in the body 228 and a short coaxial passageway 265 extending through the body 228 and opening at the wall surface of the counterbore 231. The passageway 233 in the body 228 extends through the pipe bracket 226 and is connected by a pipe bearing the same numeral to the side outlet of a pipe T 266 (FIG. 2B). The upper end of the pipe T 266 is connected by a pipe 267 to the lower end of another pipe T 268 the side outlet of which is connected by a pipe 269 to a volume reservoir 270. The upper end of the pipe T 268 is connected by a pipe 271 to a chamber 272 formed in the casing of the quick release valve device 12.

The lower end of the above-mentioned pipe T 266 is connected by a pipe 273 to the left-hand end of a double check valve device 274 the side outlet of which is connected by a pipe 275 to the right-hand end of a second double check valve device 276 that has its side outlet connected by a pipe 277 to a chamber 278 formed in the fluid pressure operated vacuum brake release valve device 14.

From the foregoing, it is apparent that while the spool-type charging valve 235 occupies the position in which it is shown in FIG. 2A, the passageway and pipe 233 and the pipes 267 and 273 connected to the pipe 233 by the pipe T 266 are vented to atmosphere via the peripheral annular groove 261 on the spool-type charging valve 235, the short passageway 265 and the choke plug 264.

While the spool-type charging valve 235 occupies the position in which it is shown in FIG. 2A, the peripheral annular grove 262 thereon connects the passageway 234 in the body 228 to that end of a passageway 279 also in the body 228 that opens at the wall surface of the counterbore 231 intermediate the ends thereof and below the location at which the passageway 234 opens at the wall surface of the counterbore 231. The opposite end of the passageway 279 opens at the wall surface of a counterbore 280 formed in the body 228 and coaxial with the counterbore 231. The passageway 234 in the body 228 extends through the pipe bracket 226 and is connected by a pipe bearing the same numeral to one end of a pipe T 281 the opposite end of which is connected by a pipe 282 to one outlet of the hereinbefore-mentioned pipe cross 20 (FIG. 2) that is disposed in the pipe 19 which is connected to the second main reservoir 4. Therefore, while the spool-type charging valve 235 occupies the position in which it is shown in FIG. 2A, the passageway 279 will be charged with fluid under pressure supplied thereto from the second main reservoir 4 via pipe 19 having therein pipe T 21 and pipe cross 20, pipe 282, pipe T 281, pipe and passageway 234, and peripheral annular groove 262 on the spool-type charging valve 235.

As shown in FIG. 2A, the upper end of the counterbore 280 in the body 228 is open to atmosphere via a short passageway 283 in the body 228, which passageway at one end opens at the wall surface of the counterbore 280 at the upper end thereof, and a choke plug 284 that is carried in a screw-threaded bore formed in the body 228, which screw-threaded bore is coaxial with the short passageway 283.

Opening at the wall surface of the counterbore 280 at the upper end thereof is one end of a passageway 285 that extends through the body 228 and the pipe bracket 226 and is connected by a pipe bearing the same numeral to the left-hand end of a pipe T 285a the side outlet of which is connected by a short pipe 285b to the hereinbefore-mentioned fluid pressure operated emergency relay valve device 17, shown in FIG. 2B of the drawings.

The charging and break-in-two indication valve device 16 further comprises a spool-type break-in-two protection valve 286 that is sealingly slidable in the counterbore 280 and intermediate its ends is provided with a collar 287 against which rests a diaphragm follower 288. The center of a flat-type diaphragm 289 is clamped between the diaphragm follower 288 and a diaphragm follower plate 290 by a nut 291 that has screw-threaded engagement with a threaded portion of the spool-type break-in-two protection valve 286.

The outer periphery of the flat-type diaphragm 289 is clamped between the lower end of the body 228 and a cover member 292 that is secured to the body 228 by any suitable means (not shown). The cover member 292 is provided with a boss 293 having therein a bottom bore 294 in which is slidably mounted the lower end of the spool-type break-in-two protection valve 286.

In order to prevent dash pot action in the lower end of the bottom bore 294, the spool-type break-in-two protection valve 286 is provided with a longitudinal bore 295, whereby the lower end of the bottom bore 294 is open to atmosphere via the bore 295, short passageway 283, and choke plug 284.

The flat-type diaphragm 289 cooperates with the body 228 and the cover member 292 to form within the charging and break-in-two indication valve device 16 and on the opposite sides of the diaphragm 289 a pair of chambers 296 and 297. The chamber 296 is connected by a passageway 298 in the body 228 and a pipe bearing the same numeral to one end of the hereinbefore-mentioned pipe T 151.

Formed in the body 228 is a short passageway 299 that opens at one end into the passageway 298 and at the opposite end into a counterbore 300 in the upper end of which is disposed a strainer device 301. Resting against the strainer device 301 is an annular spring seat 302 between which and a flat disc-type check valve 303 is interposed a spring 304 that is effective to normally bias the check valve 303 into seating contact with an annular valve seat 305 that is formed at one end of a cylindrical member 306 that is disposed in a counterbore 307 formed in the body 228 coaxial with the counterbore 300 therein and extending upward from the lower end of the body 228. Extending upward from the lower end of the cylindrical member 306 and opening into a chamber 308 therein beneath the check valve 303 is a passageway 309 which, in cooperation with a passageway 310 in the cover member 292 and a port 311 in the flat-type diaphragm 289, provides a fluid pressure communication between the chambers 297 and 308.

In order to provide a by-pass communication around the check valve 303, the body 228 is provided with a passageway 312 that, at its upper end, opens into the counterbore 307 above the check valve 303 and that, at its lower end, opens at the wall surface of the counterbore 307 in alignment with an opening in the cylindrical member 306 into which opens one end of a combined choke and strainer device 313 carried by the cylindrical member 306. The opposite end of the combined choke and strainer device 313 is in alignment with the port 311 in diaphragm 289.

In order to provide additional volume for the chamber 297, this chamber is connected to a volume reservoir 314 via the passageway 310 and a passageway 315 extending through the cover member 292, body 228 and pipe bracket 226 and opening at one end into the passageway 310 and at its other end connected by a pipe bearing the same numeral to the volume reservoir 314.

Disposed in the chamber 297 in surrounding relation to the spool-type break-in-two protection valve 286 and interposed between the cover member 292 and diaphragm follower 288 is a spring 316 that is effective to normally bias the flat-type diaphragm 289 and the break-in-two protection valve 286 to the position in which they are shown in FIG. 2A of the drawings, in which position a pair of O-rings 317 carried in a pair of spaced-apart peripheral annular grooves formed adjacent the upper end of the break-in-two protection valve 286 form a seal with the wall surface of the counterbore 280 to respectively prevent leakage of fluid under pressure from the passageway 279 to atmosphere via the counterbore 280, short passageway 283, and choke plug 284, and to the chamber 296 via the counterbore 280. Adjacent the lower end thereof, the spool-type break-in-two protection valve 286 is provided with a third peripheral annular groove in which is carried a third O-ring 317 that forms a seal with the wall surface of the bottom bore 294 to prevent leakage of atmospheric air into the chamber 297 which normally is subject to a subatmospheric pressure.

The hereinbefore-mentioned fluid pressure operated emergency relay valve device 17 (FIG. 2B) is connected by a pipe 318 to the side outlet of a pipe T 319 that is disposed in the fluid pressure brake pipe 1, and is provided with an exhaust port (not shown) to which is connected one end of a short pipe 320 the oppposite end of which is open to atmosphere.

Operation

Assume initially that the brake equipment shown in FIGS. 2, 2A, and 2B is the equipment on the leading unit A and the multi-unit locomotive shown in FIG. 1, which unit is equipped with cast iron brake shoes; that the apparatus is void of fluid under pressure; that handle 18 of the automatic brake valve device 6 (FIG. 2) is in "Release" position, and that the self-lapping unit of the brake valve device 6 has been adjusted to provide via pipe 22 a desired (such as seventy pounds per square inch) normal charged value in the fluid pressure brake pipe 1; that the spool-type selector valve 210 of manual changeover valve device 15 is in the position in which it is shown in FIG. 2 of the drawings, in which position it conditions the brake equipment shown in FIGS. 2, 2A, and 2B for lead unit operation, as will hereinafter be described in detail; and that the handle 88 (FIG. 2) of the combined cut-out cock and strainer device 9 is in the position in which it is shown in FIG. 2, in which position a cock key (not shown) that is operated by the handle 88 is in the position in which a passageway therein establishes communication between the fluid pressure brake pipe operated cut-off valve device 8 and the vacuum brake pipe 10 via a pipe 321 which connects the fluid pressure brake pipe operated cut-off valve device 8 to the combined cut-out cock and strainer device 9 and a pipe 322 which connects the combined cut-out cock and strainer device 9 to the side outlet of a pipe T 323 that is disposed in the vacuum brake pipe 10. Under these conditions, the various components of the apparatus will be in the respective positions in which they are shown in FIGS. 2, 2A, and 2B of the drawings.

*Initial charging-leading locomotive unit*

To initially charge the apparatus, the diesel engines are started for operating fluid compressors (not shown) to effect charging of the first main reservoir 3 and the second main reservoir 4 and for operating an exhaust (not shown) to effect the evaculating of fluid under pressure from the vacuum reservoir 5 which is connected to the exhauster by the pipe 190. Fluid under pressure will now charge the brake apparatus in the following manner.

Fluid under pressure will be supplied from the second main reservoir 4 via the pipe 19 having therein pipe T 21 and pipe cross 20 to the self-lapping unit of the engineer's automatic brake valve device 6.

As has been assumed, the handle 18 of the engineer's automatic brake valve device 6 is in its "Release" position. Therefore, while the handle 18 is in its "Release" position, the self-lapping unit of the engineer's automatic brake valve device 6 will be actuated to supply fluid under pressure from the pipe 19, which is connected to the second main reservoir 4, to the pipe 22 which is connected to the passageway 206 that extends through the pipe bracket 196 and the body 198 of the change-over valve device 15 and opens at the wall surface of the bore 201 in the body 198. Since it had been assumed that the spool-type selector valve 210 is in the position in which it is shown in FIG. 2, the peripheral annular groove 221 thereon establishes a communication between the passageways 206 and 207. The passageway 207 is connected by a pipe 324 to the upper end of a pipe T 325 the side outlet of which is connected by a pipe 326 to the side outlet of a second pipe T 327. One end of pipe T 327 has connected thereto one end of a pipe 328 that has its other end connected to one end of a third pipe T 329 the opposite end of which is connected by a pipe 330 to the side outlet of a pipe T 331 that is disposed in the fluid pressure brake pipe 1. Therefore, the fluid under pressure supplied to the pipe 22 by the self-lapping unit of the engineer's automatic brake valve device 6 will flow therefrom via passageway 206, peripheral annular groove 221, passageway 207, pipe 324, pipe T 325, pipe 326, pipe T 327, pipe 328, pipe T 329, pipe 330 and pipe T 331 to the fluid pressure brake pipe 1.

The fluid under pressure supplied to the fluid pressure brake pipe 1, as explained above, from the self-lapping unit of the engineer's automatic brake valve device 6 will therefore charge the fluid pressure brake pipe 1 to a pressure corresponding to a preselected normal charged value to which the self-lapping unit of the engineer's brake valve device 6 has been adjusted.

As fluid under pressure is supplied to the fluid pressure brake pipe 1, in the manner just explained, to increase the pressure therein from atmospheric pressure to the hereinbefore-mentioned preselected normal value, which, for example, may be seventy pounds per square inch, the chamber 255 in the charging and break-in-two indication valve device 16 (FIG. 2A), which is connected to the fluid pressure brake pipe 1 via the passageway and corresponding pipe 257, pipe T 94, pipe 95, and pipe T 96, and the chamber 92 in the vacuum control valve device 11 (FIG. 2B), which chamber is connected by the pipe 93 to the right-hand end of the pipe T 94, are simultaneously supplied with fluid under pressure so that the pressure in these chambers increases at the same rate as the pressure in the fluid pressure brake pipe 1 increases.

The fluid under pressure thus being supplied to the chamber 255 above the diaphragm 238 of the charging and break-in-two indication valve device 16 cannot flow therefrom, via the charging choke plug 258, to the chamber 256 below this diaphragm and the volume reservoir 259 connected thereto by the pipe and corresponding passageway 260 due to the restricted rate of flow provided by the choke plug 258, as fast as it is flowing to the chamber 255 from the fluid pressure brake pipe 1. Consequently, the pressure in the chamber 255 will increase faster than the pressure in the chamber 256 and establish a differential fluid pressure force for causing the diaphragm 238 and its follower assemblage by which it is connected to the charging valve 235 to shift downward against the yielding resistance of the caged spring 249 to correspondingly shift the spool-type charging valve 235 downward to a position in which the peripheral annular groove 261 thereon establishes a communication between the passageways 234 and 233 in the body 228. Upon the peripheral annular groove 261 establishing a communication between the passageways 234 and 233, fluid under pressure from the second main reservoir 4 that is present in the passageway 234, which passageway is connected via the pipe bearing the same numeral, pipe T 281, pipe 282, pipe cross 20, and pipe 19 having therein pipe T 21 to the second main reservoir 4, will flow from the passageway 234 to the passageway and corresponding pipe 233 which is connected to the side outlet of the pipe T 266 (FIG. 2B).

The lower end of the pipe T 266 is connected via the pipe 273 to the left-hand end of the double check valve device 274 the side outlet of which is connected by the pipe 275 to the right-hand end of the double check valve device 276 the side outlet of which is connected by the pipe 277 to the chamber 278 in the casing of the fluid pressure operated vacuum brake release valve device 14. The upper end of the pipe T 266 is connected by the pipe 267, pipe T 268 the side outlet of which is connected by the pipe 269 to the volume reservoir 270, and the pipe 271 to the chamber 272 in the quick release valve device 12.

Since it has been assumed that the spool-type selector valve 210 (FIG. 2) of the manually operated change-over valve device 15 is in the position in which it is shown in FIG. 2 to condition the brake equipment for lead unit operation, the peripheral annular groove 220 thereon establishes a communication between the passageways 203 and 204 that extend through the body 198 and the pipe bracket 196. The passageway 204 is connected by a pipe 332 to the side outlet of a pipe T 333 the lower end of which is connected by a pipe 334 to the upper end of a pipe T 335 the lower end of which is connected by a pipe 336 to a third outlet of the pipe cross 20, which pipe cross, as hereinbefore explained, is connected to the second main reservoir 4. The passageway 203 is connected by a pipe 337 to the right-hand end of the hereinbefore-mentioned double check valve device 274 (FIG. 2B). Therefore, as the second main reservoir 4 is charged by operation of the fluid compressors, fluid under pressure will flow therefrom via pipe 19 having therein pipe T 21, pipe cross 20, pipe 336, pipe T 335, pipe 334, pipe T 333, pipe 332, passageway 204, peripheral annular groove 220 on the spool-type selector valve 210 of the change-over valve device 15, passageway 203, and pipe 337 to the right-hand end of the double check valve device 274 and position the double check valve therein to establish a communication between the pipe 337 and the pipe 275, it being understood that the rate of build-up of pressure in the second main reservoir 4, and, therefore, in the pipe 337 which is supplied with fluid under pressure therefrom, as just explained, is more rapid than the build-up of pressure in the fluid pressure brake pipe 1 via the engineer's brake valve device 6 and the pipe 273 which is supplied with fluid under pressure from the second main reservoir 4 via the charging and break-in-two indication valve device 16. The fluid under pressure thus supplied from the second main reservoir 4 to the pipe 275 will flow to the right-hand end of the double check valve device 276 and position the double check valve therein to establish a communication between the pipes 275 and 277, whereupon fluid under pressure will flow to the chamber 278 below the piston 178 and move this piston and piston rod 177 upward against the yielding resistance of the spring 173 to establish a communication between the chambers 175 and 171 in the vacuum brake release valve device 14.

The fluid under pressure supplied from the second main reservoir 4 to the pipe 233 by operation of the charging and break-in-two indication valve device 16 will flow therefrom via pipe T 266, pipe 267, pipe T 268 and pipe 269 to the timing volume reservoir 270 and simultaneously via the upper end of pipe T 268 and pipe 271 to the chamber 272 below the piston 192 of the quick release valve device 12 so that the pressure in the timing volume reservoir 270 and the chamber 272 increase at the same rate. Therefore, when the pressure in the chamber 272 has increased to a value sufficient to overcome the biasing force of the spring 185, the piston 192 and piston and piston rod 193 will be moved upward against the yielding resistance of the spring 185 to effect unseating of the disc-shaped valve 184 from the annular valve seat 186 and thereby establish a communication between the chambers 187 and 188 in the quick release valve device 12.

At the same time that fluid under pressure is flowing from the fluid pressure brake pipe 1 to the chamber 255 of the charging and break-in-two indication valve device 16 to effect operation of this device to supply fluid under pressure to the pipe 233, fluid under pressure is also flowing from the fluid pressure brake pipe 1 to the chamber 92 of the vacuum control valve device 11 (FIG. 2B) to operate this valve device, in a manner now to be described, to move the valve 141 upward from the position in which it is shown in FIG. 2B to a position in which this valve is closer and very near to the annular valve seat 146.

Fluid under pressure supplied by the engineer's brake valve device 6 to the fluid pressure brake pipe 1 flows therefrom via pipe T 96 (FIG. 2A), pipe 95, pipe T 94 and pipe 93 to the control chamber 92 of the vacuum control valve device 11 (FIG. 2B) and when the pressure in this chamber has reached a value slightly in excess of, for example, fifty pounds per square inch, this pressure acting over the effective area of the diaphragm 91 establishes a force acting in a right-hand direction that is in excess of the force established by the cage spring 156 and acting in a left-hand direction, which greater force will deflect the diaphragm 91 in a right-hand direction against the yielding resistance of the caged spring 156 to shift, through the medium of the operating stem 101, the cam carrier 108 and the cam element 114 that is pivotally mounted on the cam carrier 108 in the direction of the right hand, it being understood that the cam carrier 108 is supported on the rollers 109 as it is thus shifted.

Since the roller 122 is rotatably mounted on the pin 121 carried by the cam lever 118 which is pivoted on the pin 119 that has its opposite ends anchored in the opposite vertical walls of the stationary casing 89 of the vacuum control valve device 11, the roller 122 will roll or ride up the cam surface 123 formed on the cam element 114 as this cam element and the cam carrier 108 are moved in the direction of the right hand against the yielding resistance of spring 156 in response to the increasing pressure of fluid in the chamber 92. As the roller 122 thus rolls or rides up the cam surface 123 on the cam element 114, this roller is effective, through the intermediary of the pin 121 on which it is rotatably mounted, to rock the cam lever 118 clockwise, as viewed in FIG. 2B, about the pin 119. As the cam lever 118 is thus rocked clockwise, the roller 126, which is rotatably mounted on the pin 125 carried by the cam lever 118, by reason of the fact that this roller supports the pusher sleeve 127, is effective to move the pusher sleeve 127 upward. The spring 137 is interposed between the collar 136 on the valve pusher 135 and the bottom of the counterbore 131 in the pusher sleeve 127 and is effective to bias the collar 136 against the snap ring 138 carried by the pusher sleeve 127. Therefore, the valve pusher 135 will be moved upward simultaneously with the pusher sleeve 127 to, through the intermediary of the wear pin 139 carried in the upper end of the valve pusher 135 and the valve tip 140 carried by the valve 141, move the valve 141 toward the annular valve seat 146. It should be understood that the contour of the cam surface 123 formed on the cam element 114 is such that for each increment of increase in pressure in the chamber 92, the valve 141 will be moved upward toward the annular valve seat 146 a sufficient distance to provide for a proportionate decrease in the subatmospheric pressure in the vacuum brake pipe 10, in a manner which will now be explained in detail.

The chamber 132 in the valve body 133 is connected by the passageway and corresponding pipe 150, pipe T 151, and pipe 170 to the chamber 171 in the fluid pressure operated vacuum brake release valve device 14, and by the pipe 13 to the chamber 187 in the quick release valve device 12. Also, so long as the valve 141 is unseated from the annular valve seat 146, atmospheric air may flow into the chamber 132 via pipe 149, filter device 148, pipe and corresponding passageway 147, chamber 144, and bore 143 at a rate determined by the annular area between the seating surface of the valve 141 and the annular valve seat 146 or, in other words, the amount the valve 141 is open, it being understood that this annular area varies directly as the distance between the seating surface of the valve 141 and the annular valve seat 146.

Furthermore, as hereinbefore explained in detail, the disc-shaped valve 184 in the quick release valve device 12 is now unseated from its corresponding annular valve seat 180, and the disc-shaped valve 172 in the fluid pressure operated vacuum brake release valve device 14 is also unseated from its corresponding annular valve seat 174. Consequently, the vacuum reservoir 5 is now connected to the vacuum brake pipe 10 via pipe 189, chambers 188 and 187 in the quick release valve device 12, pipe 13, chamber 132, pipe 150, pipe T 151, pipe 170, chambers 171 and 175 in the vacuum brake release valve device 14, pipe 180, filter device 181, pipe 182, and pipe T 183 disposed in the vacuum brake pipe 10. Since the exhauster that is connected via the pipe 190 to the vacuum reservoir 5 is now operating, as hereinbefore stated, it will be effective to evacuate fluid under pressure from the vacuum reservoir 5, the chamber 132, and the vacuum brake pipe 10 simultaneously as fluid under pressure is supplied by the self-lapping unit of the engineer's brake valve device 6 to the fluid pressure brake pipe 1 and the chamber 92 to effect the charging thereof up to the hereinbefore-mentioned desired normal charged value, which, as previously stated, may be, for example, seventy pounds per square inch.

It should be noted that as fluid under pressure is evacuated from the chamber 132, in the manner just explained, atmospheric air flows to the chamber 132 via pipe 149, filter device 148, pipe and passageway 147, chamber 144 and bore 143 at a rate determined by the distance between the seating surface of the valve 141 and the annular valve seat 146, as hereinbefore explained. Therefore, as the valve 141 is moved toward the annular valve seat 146 in response to the increase in pressure in the chamber 92 of the vacuum control valve device 11, in the manner hereinbefore explained, the quantity of atmospheric air admitted to the chamber 132 per unit of time will decrease. Since the chamber 132 is connected to the vacuum reservoir 5 and the vacuum brake pipe 10, as explained above, it will be apparent that the continued operation of the exhauster will be effective to decrease the subatmospheric pressure in the vacuum reservoir 5, the chamber 132, and the vacuum brake pipe 10 as the valve 141 is moved toward the annular valve seat 146, in response to the increasing pressure in the chamber 92, to thereby decrease the quantity of atmospheric air admitted to the chamber 132. Consequently, as the self-lapping unit of the engineer's brake valve device 6 operates to increase the pressure in the fluid pressure brake pipe 1 and the chamber 92 in the vacuum control device 11 from, for example, fifty pounds per square inch to, for example, seventy pounds per square inch, the valve 141 will be moved toward the annular valve seat 146 to effect a decrease in the quantity of atmospheric air admitted to the chamber 132 to thereby render the exhauster effective to evacuate fluid under pressure from the vacuum reservoir 5, the chamber 132 and the vacuum brake pipe 10 to reduce the pressure therein from, for example, atmospheric pressure or zero inches of mercury (Hg) to, for example, a subatmospheric pressure of twenty inches of mercury (Hg).

The side outlet of the pipe T 323 (FIG. 2) is connected by the pipe 322 to the combined cut-out cock and strainer device 9 (FIG. 2) which, in turn, is connected by the pipe 321 and a passageway bearing the same numeral to the chamber 86 (FIG. 4) of the brake pipe pressure operated cut-out valve device 8 (FIG. 2). Also, the chamber 74 (FIG. 4) in the brake pipe pressure operated cut-out valve device 8 is connected by a passageway and corresponding pipe 338 to one end of a pipe T 339; the chamber 81 is connected by a passageway and corresponding pipe 340 to one end of a pipe T 341 the side outlet of which is connected by a pipe 342 to the branch passageway 61a in the pipe bracket 21 of the brake control valve device 7 (FIG. 2A) and the one end of which pipe T 341 is connected by a pipe 343 to the left-hand end of the hereinbefore-mentioned double check valve device 276; and the chamber 67 (FIG. 4) above the diaphragm 65 is connected by a passageway and corresponding pipe 344 (FIG. 2) to the lower end of the hereinbefore-mentioned pipe T 325 the upper end of which is connected via pipe 324, passageway 207, peripheral annular groove 221 on selector valve 210, passageway 206 and pipe 22 to the engineer's automatic brake valve device 6. Therefore, the pipe 344 is now charged to the desired normal charged value by the self-lapping unit of the engineer's automatic brake valve device 6. Consequently, fluid under pressure flows from pipe 344 to the chamber 67 above the diaphragm 65 via the corresponding passageway to deflect this diaphragm 65 downward against the yielding resistance of the spring 71 to first effect seating of the valve 75 on the valve seat 77 and then effect unseating of valve 84 from its valve seat 85. With the valve 84 unseated, a communication is established between the chambers 86 and 81 thereby to connect the pipe and passageway 321 to the passageway and pipe 340 that is connected via pipe T 341 and pipe 342 to the branch passageway 61a (FIG. 2A) that extends from the flat face 62 on the lower side of the pipe bracket 21 of the brake control valve device 7 through this pipe bracket and the casing section 29 of the service valve device 25 of the brake control valve device 7 and joins with the passageway 61 in the service valve device 23 intermediate the ends thereof. One end of the passageway 61 opens into the chamber 52 below the diaphragm 28 of the service valve device 25 and the opposite end of this passageway opens into the outlet chamber 60 above the flat disc valve 55.

With the valve 84 of the cut-out valve device 8 now unseated, as hereinbefore explained, the vacuum brake pipe 10 is connected to the passageway 61 in the service valve device 25 of the brake control valve device 7 via pipe T 323 (FIG. 2), pipe 322, the combined cut-out cock and strainer device 9, pipe and passageway 321, chambers 86 and 81 in cut-out valve device 8, passage-way and pipe 340, pipe T 341, pipe 342, and branch passageway 61a so that the chambers 52 and 60 are evacuated of fluid under pressure. As the chamber 60 is thus evacuated, fluid under pressure from the chamber 51 above the diaphragm 28 will flow via the passageway 58 and choke 59 to unseat the flat disc-type valve 55 against the yielding resistance of the spring 56 and establish a communication between the chambers 51 and 60 so that the chamber 51 is evacuated simultaneously with the chambers 60 and 52. Since the chambers 51 and 52 are thus evacuated simultaneously, the various components of the service valve device 25 of the brake control valve device 7 on the locomotive unit A will remain in their release position in which they are shown in FIG. 2A to maintain the brakes on the locomotive unit A released.

When the pressure in the fluid pressure brake pipe 1 has been increased to the hereinbefore-mentioned desired normal charged value, the self-lapping unit of the engineer's brake valve device 6 will lap off or cease to supply fluid under pressure to the fluid pressure brake pipe 1 and will maintain the desired normal pressure therein against leakage.

When the self-lapping unit of the engineer's brake valve device 6 ceases to supply fluid under pressure to the fluid pressure brake pipe 1 to increase the pressure therein above the desired normal charged value, there will be no further increase in the pressure in the chamber 92 of the vacuum control valve device 11 and in chamber 255 of the charging and break-in-two indication valve device 16.

Subsequent to cessation of the supply of fluid under pressure from the fluid pressure brake pipe 1 to the chamber 92 of the vacuum control valve device 11 to increase the pressure therein, the valve 141 will not be moved further in the direction of the annular valve seat 146 and will be maintained in a position slightly below the annular valve seat 146. Therefore, as the vacuum exhauster to which the pipe 190 is connected continues to operate, a limited amount of atmospheric air will be drawn into the exhausting chamber on each downward stroke of the exhauster piston via pipe 149, filter device 148, pipe and passageway 147, chamber 144, bore 143, past the slightly open valve 141, chamber 132, pipe 13, chambers 187 and 188 in the quick release valve device 12 the valve 184 of which is now unseated, pipe 189, vacuum reservoir 5, and pipe 190. As is well known, a sub-atmospheric pressure is maintained in the crankcase chamber of the exhauster. Hence, the upper face of the exhauster piston is subject to air admitted to the exhausting chamber from the atmosphere and at a subatmospheric pressure, and the lower face of this piston is subject to a lower subatmospheric pressure. Accordingly, this difference in pressure on the opposite faces of the piston of the exhauster imposes a differential fluid pressure on the piston which acts in the direction from the exhausting chamber toward the crankcase chamber to reduce the susceptibility of lubricating oil to pass from the crankcase chamber to the exhausting chamber of the exhauster.

This atmospheric air admitted to the exhausting chamber of the exhauster is effective to cool the walls of the exhauster cylinder so that the operating temperature of the metal comprising the exhauster cylinder is less than it would otherwise be if no atmospheric air were admitted to the exhausting cylinder and the exhauster operated against a lower subatmospheric pressure in the vacuum brake pipe 10 which would be the case if no atmospheric air were admitted to the chamber 132.

Atmospheric air admitted to the chamber 132 in the manner described above also flows therefrom to the vacuum brake pipe 11 via pipe 150, pipe T 151, pipe 170, chambers 171 and 175 in the fluid pressure operated vacuum brake release valve device 14, pipe 180, filter device 181, pipe 182 and the pipe T 183 that is disposed in the vacuum brake pipe 11 to prevent a reduction in the subatmospheric pressure in the vacuum brake pipe 11 to a value below that desired which, for example, may be twenty inches of mercury (Hg).

From the foregoing, it is apparent that as the diaphragm 91 of the vacuum control valve device 11 is deflected in the direction of the right hand in response to the pressure in the chamber 92 and the fluid pressure brake pipe 1 increasing, for example, from fifty pounds per square inch to, for example, seventy pounds per square inch, the valve 141 is moved in a direction toward the annular valve seat 146 to a position in which the valve 141 is just open sufficiently to admit the proper amount of air at atmospheric pressure and temperature past the valve 141 and thence to the exhausting chamber of the exhauster and the vacuum brake pipe 10 to insure that the exhauster operates without undue heating and loss of oil from the crankcase chamber by passage therefrom past the rings on the exhauster piston to the exhausting chamber, and to insure that the subatmospheric pressure in the vacuum brake pipe 10 is not reduced below a normal chosen value by operation of the exhauster subsequent to the pressure in the fluid pressure brake pipe 1 increasing to a chosen value, which, for example, may be seventy pounds per square inch.

Subsequent to cessation of the supply of fluid under pressure from the fluid pressure brake pipe 1 to the chamber 255 of the charging and break-in-two indication valve device 16 to increase the pressure in this chamber, the fluid under pressure in the chamber 255 will flow through the choke plug 258 to the chamber 256 and from thence through the passageway and corresponding pipe 260 to the volume reservoir 259 until the pressure in the chambers 255 and 256 and in the volume reservoir 259 are all equal whereupon the spring 249 is rendered effective to deflect the diaphragm 238, and its follower assemblage to which the spool-type valve 235 is secured, upward until the annular plate 248 abuts the outturned flange 251 of the cup-shaped member 252. Upon upward movement of the spool-type valve 235 to the position in which it is shown in FIG. 2A, the peripheral annular groove 261 on the spool-type valve 235 is moved to the position shown in FIG. 2A in which communication is closed between the passageway 234 and the passageway 233.

It may be noted at this point that the volume of the reservoir 259 is such that the time required for equalization of pressure from the chamber 255 into the chamber 256 and the reservoir 259 insures that the spool-type valve 235 is not returned to its upper position in which it is shown in FIG. 2A until after the valve 141 of the vacuum control valve device 11 (FIG. 2B) has been moved to its minimum open position. Therefore, upon movement of the spool-type valve 235 to the position shown in FIG. 2A in which the peripheral annular groove 261 closes communication between the passageways 234 and 233, fluid under pressure is vented from the chamber 272 (FIG. 2B) and the volume reservoir 270 connected thereto via the pipe 269, pipe T 268, and pipe 271 to atmosphere via pipe 267, pipe T 266, pipe and passageway 233 (FIG. 2A), peripheral annular groove 261, short passageway 265 and choke plug 264. Upon the release of fluid under pressure from the chamber 272 in the quick release valve device 12 (FIG. 2B) the spring 185 is rendered effective to move the disc-type valve 184 into contact with the annular valve seat 186 so that the chambers 187 and 188 are connected only by the orifice 191 through which the exhauster can evacuate fluid under pressure from the vacuum brake pipe 10 to maintain the desired degree of subatmospheric pressure therein against normal leakage.

Initial charging—Trailing locomotive unit

Let it now be assumed that the brake equipment shown in FIGS. 2, 2A, and 2B is the equipment on one of the trailing units B or C of the multi-unit locomotive shown in FIG. 1, which trailing unit is equipped with cast iron brake shoes, it being understood that the operation of the equipment on each trailing unit is the same. To condition the brake equipment shown in FIGS. 2, 2A, and 2B for trailing unit operation, the spool-type selector valve 210 of the manual change-over valve device 15 must be shifted axially from a "Lead" position in which it is shown in FIG. 2 in the direction of the right hand to a second or "Trail or Dead" position.

To shift the spool-type selector valve 210 axially in the direction of the right hand from its first or "Lead" position to its second or "Trail or Dead" position, the engineer first pushes the handle 216 downward against the biasing force of the spring 217 to disengage or unlock the pin 218 from a position-defining notch in the cover member 219.

Next, the engineer will rotate the handle 216 so that the pin 218 through engagement with the rotatable member 214 effects rotation thereof whereupon the dog 213, eccentrically carried thereby and extending into the notch in the spool-type selector valve 210, effects shifting in the direction of the right hand of the spool-type selector valve 210 from its "Lead" position in which it is shown in FIG. 2 to its second or "Trail or Dead" position in which the pin 218 can be spring-pressed into another position-defining notch in the cover member 219 upon the engineer releasing the handle 216.

As shown in FIG. 3, which is a diagrammatic development view showing the connections established in "Lead" and in "Trail or Dead" positions of the spool-type selector valve 210, when the spool-type selector valve 210 is shifted from its "Lead" position to its "Trail or Dead" position, the passageway 204, which is connected to the second main reservoir 4 via the pipe 332, pipe T 333, pipe 334, pipe T 335, pipe 336, pipe cross 20, and pipe 19 having pipe T 21 therein, is cut off from the passageway 203, which is connected via the pipe 337, double check valve device 274 (FIG. 2B), pipe 275, double check valve device 276 and pipe 277 to the chamber 278 in the fluid pressure operated vacuum brake release valve device 14, and the passageway 203 is open to atmosphere via the left-hand end of the bore 201 and the port 212 in the body 198 since the O-ring 225 adjacent the left-hand end of the peripheral annular groove 220 on the spool-type selector valve 210 is now disposed in a position on the right-hand side of the opening of the passageway 203 at the wall surface of the bore 201 in the body 198. Consequently, no fluid under pressure will be supplied from the second main reservoir 4 to the chamber 278 in the fluid pressure operated vacuum brake release valve device 14 on the respective trailing unit and the chamber 278 thereof will be open to atmosphere to render the spring 173 effective to seat the disc-shaped valve 172 on the annular valve seat 174 to close communication between the chambers 171 and 175.

Furthermore, as shown in FIG. 3, when the spool-type selector valve 210 is shifted from its "Lead" position to its "Trail or Dead" position, the peripheral annular groove 220 establishes a communication between the passageway 204 and the passageway 205 which is closed by the plate blanking pad 224, as shown in FIG. 2; the peripheral annular groove 221 cuts off communication between the passageways 206 and 207; and the peripheral annular groove 222 cuts off communication between the passageways 208 and 209.

As indicated diagrammatically in FIG. 1 of the drawings, the fluid pressure brake pipe 1 on the leading unit A is connected by the usual hose and hose couplings to the fluid pressure brake pipe 1 on the first railing unit B, and likewise the fluid pressure brake pipe 1 on the first trailing unit B is connected to the fluid pressure brake pipe 1 on the second trailing unit C. Therefore, as fluid under pressure is supplied by the self-lapping unit of the engineer's automatic brake valve device 6 on the leading locomotive unit A from the first main reservoir 4 on this unit to the fluid pressure brake pipe 1 on the leading unit A as hereinbefore described, it will flow therefrom to the fluid pressure brake pipe 1 on the trailing units B and C so that the pressure in the fluid pressure brake pipe 1 of each of the three locomotive units is increased substantially simultaneously to the hereinbefore-mentioned desired normal charge value.

The fluid under pressure supplied to the fluid pressure brake pipe 1 on each trailing unit B and C will effect identical operation of the brake equipment on these respective trailing units. Therefore, a description of the operation of the brake equipment on one trailing unit will suffice for both.

Assuming that the spool-type selector valve 210 of the manual change-over valve device 15 on each trailing unit has been moved to its "Trail or Dead" position, as had been explained, and that the diesel engines on the trailing units have been started to operate the fluid compressors on each trailing unit to effect charging of the first main reservoir 3 and the second main reservoir 4, and to operate the exhauster on each trailing unit, the various other components of the apparatus on each trailing unit will be in the respective positions in which they are shown in FIGS. 2, 2A, and 2B of the drawings.

As fluid under pressure is supplied from the fluid pressure brake pipe 1 on the leading locomotive unit A to the fluid pressure brake pipe 1 on the trailing units B and C, it will flow from the fluid pressure brake pipe 1 on the respective trailing unit to the chamber 92 in the vacuum control valve device 11 on the respective trailing unit and operate this valve device in a manner hereinbefore described in detail to move the valve 141 upward toward the annular valve seat 146 to a position in which the valve 141 is disposed a very short distance away from the annular valve seat 146.

Fluid under pressure will also flow from the fluid pressure brake pipe 1 on the respective trailing unit to the chamber 255 in the corresponding charging and break-in-two indication valve device 16 (FIG. 2A) and operate this valve device in a manner hereinbefore described in detail to deflect the diaphragm 238 and its follower assemblage downward to move the valve 235 downward to a position in which the peripheral annular groove 261 on the spool-type valve 235 establishes a communication between the passageways 234 and 233 whereupon fluid under pressure will flow from the passageway 234 to the passageway 233 and corresponding pipe which is connected to the side outlet of the pipe T 266 (FIG. 2B).

Some of the fluid under pressure supplied to the pipe 233 flows via pipe T 266, pipe 267, pipe T 268 the side outlet of which is connected by the pipe 269 to the volume reservoir 270, and pipe 271 to the chamber 272 below the piston 192 of the quick release valve device 12 so that upon the pressure in the volume reservoir 270 and the chamber 272 increasing to a value sufficient to overcome the biasing force of the spring 185, the disc-shaped valve 184 will be moved upward against the yielding resistance of the spring 185 and out of seating contact with the annular valve seat 186 to establish an unrestricted communication between the chambers 187 and 188 in the quick release valve device 12 on the respective trailing unit.

Also, some of the fluid under pressure supplied to the pipe 233 flows via pipe T 266 and the pipe 273 to the left-hand inlet of the double check valve device 274 to move the double check valve therein to its right-hand position, if it is not already in this position, to establish a communication between the pipe 273 and the pipe 275 whereupon the fluid under pressure being supplied to the pipe 273 from the pipe 233 flows via the pipe 275, the double check valve device 276, and the pipe 277 to the chamber 278 in the fluid pressure operated vacuum brake release valve device 14 on the respective trailing unit. Fluid under pressure thus supplied to the chamber 278 is effective on the piston 178 to overcome the biasing force of the spring 173 and effect unseating of the disc-shaped valve 172 from the annular valve seat 174 to establish a communication between the chambers 171 and 175 in the fluid pressure operated vacuum brake release valve device 14 on the respective trailing unit.

The vacuum reservoir 5 on the respective trailing unit is now connected to the vacuum train pipe 10 on this trailing unit via pipe 189, chambers 188 and 187 in the quick release valve device 12, pipe 13, chamber 132 in the vacuum control valve device 11, pipe 150, pipe T 151, pipe 170, chambers 171 and 175 in the vacuum brake release valve device 14, pipe 180, filter device 181, pipe 182, and pipe T 183. Consequently, the exhauster on each respective trailing unit, which is connected to the vacuum reservoir 5 on the respective trailing unit by the pipe 190, will now operate to evacuate the vacuum brake pipe 10 on the respective trailing unit.

The handle 18 on the engineer's brake valve device 6 on each respective trailing unit is in its "Release" position. Therefore, the self-lapping unit of the engineer's brake valve device 6 on each respective trailing unit is effective to supply fluid under pressure from the second main reservoir 4 thereon to the chamber 67 (FIG. 4) of the corresponding fluid pressure brake pipe operated cut-out valve device 8 (FIG. 2) so that this valve device is operated to establish a communication hereinbefore described in detail between the chambers 51 and 52 in the brake control valve device 7 on each respective trailing unit and the corresponding vacuum brake pipe 10 so that the brakes on each respective trailing unit are maintained released in the same manner as the brakes on the leading unit A.

As indicated diagrammatically in FIG. 1 of the drawings, the vacuum brake pipe 10 on the locomotive B is connected by suitable hose and couplings to the vacuum brake pipe 10 on the adjacent locomotive units A and C. Furthermore, when the three-unit locomotive is coupled to a train of cars, the vacuum brake pipe 10 on the locomotive unit C is connected to the vacuum train pipe (not shown) that extends through the train of cars, each of which cars is provided with vacuum brake equipment. Therefore, the exhauster on each of the trailing locomotive units B and C will now assist the exhauster on the leading locomotive unit A in evacuating the vacuum brake pipe 10 extending through each locomotive unit and the train vacuum brake pipe extending through the cars in the train. The exhausters on the trailing locomotive units B and C are thus operated to assist the exhauster on the leading locomotive unit A until the pressure in the fluid pressure brake pipe 1 has increased to a normal charged value at which time the valve 141 of the vacuum control valve device 11 on each of the three locomotive units A, B, and C will occupy its minimum open position, as hereinbefore explained in detail.

Furthermore, when the pressure in the fluid pressure brake pipe 1 has been increased to the normal charged value, the charging and break-in-two indication valve device 16 on each of the three locomotive units A, B, and C will operate in the manner hereinbefore explained to effect movement of the respective spool-type valve 235 upward to the position shown in FIG. 2A to cut off the flow of fluid under pressure from the main reservoir 4, which is connected to the passageway and corresponding pipe 234 via pipe T 281, pipe 282, pipe cross 20, and pipe 19 having therein pipe T 21, to the passageway 233 which is connected by the pipe bearing the same numeral and the pipe T 266 to the pipes 267 and 273.

When the spool-type valve 235 of each charging and break-in-two indication valve device 16 is returned to the position in which it is shown in FIG. 2A of the drawings, the corresponding passageway 233 is open to atmosphere via the peripheral annular groove 261 on a spool-type valve 235, the short passageway 265 and the choke plug 264. Therefore, on the trailing units B and C, fluid under pressure will be vented from the chamber 272 in each respective quick release valve devic 12 and from the chamber 278 in each respective fluid pressure operated vacuum brake release valve device 14 to atmosphere via paths hereinbefore traced in detail, whereupon the spring 195 in each quick release valve device 12 will be rendered effective to seat the corresponding disc-shaped valve 184 on the annular valve seat 186 to close the large capacity communication between the chamber 188 and 187 in each respective quick release valve device 12, and the spring 173 in each respective fluid pressure operated vacuum brake release valve device 14 will be rendered effective to seat the corresponding disc-shaped valve 172 on the annular valve seat 174 to close communication between the chamber 171 and 175 in each respective fluid pressure operated vacuum brake release valve device 14.

With the valve 141 of the vacuum control valve device 11 on each of the trailing units B and C in its minimum open position and the quick release valve device 12 and the vacuum brake release valve device 14 on each of these trailing units closed, the vacuum reservoir 5 and the exhauster connected thereto on each trailing unit B and C will be cut off from the corresponding vacuum brake pipe 10 on the respective unit so that these exhausters are no longer effective to evacuate the vacuum brake pipe extending through the three locomotive units and the cars in the train.

On the leading locomotive unit A, the spool-type selector valve 210 of the manual change-over valve device 15 is in "Lead" position to effect the supply of fluid under pressure from the second main reservoir 4 to the chamber 278 in the fluid pressure operated vacuum brake release valve device 14 on this unit to maintain the corresponding disc-shaped valve 172 constantly unseated. Therefore, when the pressure in the fluid pressure brake pipe 1 had been increased to the normal charged value and the charging and break-in-two indication valve device 16 on the leading unit A operates to return the spool-type valve 235 to the position in which it is shown in FIG. 2A, fluid under pressure will be vented from the chamber 272 in the quick release valve device 12, but fluid under pressure will not be vented from the chamber 278 in the fluid pressure operated vacuum brake release valve device 14 on this leading unit. Therefore, on the leading unit A, a restricted communication is maintained between the vacuum reservoir 5 and the vacuum brake pipe 10 via pipe 189, chamber 188, orifice 191 and chamber 187 in the quick release valve device 12, pipe 13, chamber 132 in the vacuum control valve device 11, pipe 150, pipe T 151, pipe 170, chambers 171 and 175 in the fluid pressure operated vacuum brake release valve device 14, pipe 180, filter device 181, pipe 182 and pipe T 183. Consequently, the exhauster that is connected to the vacuum reservoir 5 by the pipe 190 is rendered operatively effective to maintain the desired subatmospheric pressure in the vacuum brake pipe extending through the three locomotive units A, B, and C and the cars in the train against normal vacuum brake pipe leakage.

*Service application of brakes on leading unit*

Each locomotive unit is provided with a break-in-two protection valve device 63 (FIG. 2) and a selector valve device 345 (FIG. 2A) for conditioning the brake equipment on the respective unit for operation either as a leading unit or as a trailing or dead unit, and a self-lapping type relay valve device 346 (FIG. 2B) operative in a manner hereinafter explained in detail to effect the supply of fluid under pressure from the second main reservoir 4 on the respective unit to the corresponding brake cylinder device 2 to apply the brakes on the respective unit.

As hereinbefore stated, the break-in-two protection valve device 63 (FIG. 2) is identical in construction to the valve device shown in cross section in FIG. 4, and, therefore, need not be described in detail.

The selector valve device 345 (FIG. 2A) comprises a valve 347 contained in a chamber 348 that is open to a passageway 349 that extends through a cover member 350 that is secured by any suitable means (not shown) to one end of a casing section 351 the opposite end of which is secured by any suitable means (not shown) to another casing section 352 that has a vertical flat face 353 to which is secured a pipe bracket 354 by any suitable means (not shown). This passageway 349 extends through the casing sections 351 and 352 and the pipe bracket 354 and is connected by a pipe bearing the same numeral to a pipe T 355 that is disposed in a brake cylinder equalizing pipe 356 that extends from end to end of each locomotive unit and is connected by the usual hose and hose couplings to a corresponding brake cylinder equalizing pipe on the adjacent locomotive unit. The valve 347 is provided with a fluted valve stem 357 that is mounted in a bore 358 in the casing section 351 and extends into a chamber 359 formed by the cooperative relationship of the casing sections 351 and 352. The chamber 359 is connected by a passageway 360 that extends through the casing section 352 and the pipe bracket 354 and a corresponding pipe bearing the same numeral to the side outlet of a pipe T 361. A spring 362 is disposed in the chamber 348 and is interposed between the cover member 350 and the valve 347 for urging this valve into seating contact with an annular valve seat 363 formed at the lower end of the bore 358. The upper end of the fluted valve stem 357 is arranged in alignment with a stem 364 extending from the chamber 359 through a partition wall 365 into a chamber 366 where it terminates in a diaphragm follower head 367 against which rests one side of the center of a flexible diaphragm 368 the outer periphery of which is clamped between the upper end of the casing section 352 and a cover member 369 that is secured to the casing section 352 by any suitable means (not shown) and cooperates with the diaphragm 368 to form a chamber 370. The chamber 370 is connected by a passageway 371 that extends through the cover member 369, casing section 352, and the pipe bracket 354 and a corresponding pipe bearing the same numeral to the side outlet of a pipe T 372. The lower end of the pipe T 372 is connected by a pipe 373 to the side outlet of a pipe T 374 that is disposed in a main reservoir equalizing pipe 375 that extends from end to end of each unit of the locomotive and is connected by the usual hose and hose couplings to a corresponding main reservoir equalizing pipe on an adjacent unit of the multi-unit locomotive. The chamber 366 below the diaphragm 368 is open to atmosphere through a choke plug 376 that is carried by the casing section 352. Disposed in the chamber 366 is a spring 377 that surrounds the stem 364 and is interposed between the diaphragm follower head 367 and a spring seat 378 that rests against the upper side of the partition wall 365. The spring 377 acts through the diaphragm follower head 367 on the diaphragm 368 for biasing the diaphragm follower head 367, the diaphragm 368 and the stem 364 to the position in which they are shown in FIG. 2A of the drawings to permit seating of the valve 347 on the annular valve seat 363 by the spring 362.

As shown in FIG. 2A, a pipe T 379 is disposed in the main reservoir equalizing pipe 375 and has its side outlet connected by a pipe 380 to the first main reservoir 3, there being a one-way flow check valve device 381 disposed in the pipe 380. A choke 382 is connected in bypassing relation to the check valve device 381 so that fluid under pressure may flow at a rapid rate from the main reservoir equalizing pipe 375 to the first main reservoir 3 via the check valve 381 and at a restricted rate from this reservoir to the pipe 375 via the choke 382 to prevent excessive waste of air in the event the pipe 375 is ruptured.

It should be understood that the end of the hose at the right-hand end of the vacuum brake pipe 10, fluid pressure brake pipe 1, brake cylinder equalizing pipe 356, and the main reservoir equalizing pipe 375 on the leading unit A and the left-hand end of the fluid pressure brake pipe 1, the brake cylinder equalizing pipe 356 and the main reservoir equalizing pipe 375 on the trailing unit C are all closed by suitable dummy couplings.

Since the main reservoir equalizing pipe 375 is normally charged to the pressure present in the first main reservoir 3, fluid under pressure will flow from the main reservoir equalizing pipe 375 via the side outlet of the pipe T 374 (FIG. 2A), pipe 373, the side outlet of the pipe T 372 and the pipe and corresponding passageway 371 to the chamber 370 above the diaphragm 368 of the selector valve device 345 on the leading unit A.

The upper end of the pipe T 372 (FIG. 2A) is connected by a pipe 383 and passageway bearing the same numeral to the diaphragm chamber 67 of the break-in-two protection valve device 63 (FIG. 2). Fluid under pressure thus supplied to the chamber 67 of the break-in-two protection valve device 63 is effective to deflect the diaphragm 65 of this valve device downward against the yielding resistance of the spring 71 to first effect seating of the valve 75 on the valve seat 77 and then effect unseating of valve 84 from its valve seat 85. With the valve 84 unseated, a communication is established between the chamber 86 and the chamber 81.

The chamber 81 of the break-in-two protection valve device 63 (FIG. 2) is connected by a passageway and corresponding pipe 384 to the left-hand end of a pipe T 385 the side outlet of which is connected by a pipe 386 to the hereinbefore-mentioned passageway 209 that extends through the pipe bracket 196 and the body 198 of the manually operated change-over valve device 15 and opens at the wall surface of the bore 201 in the body 198. The right-hand end of the pipe T 385 is connected by a pipe 387 to the upper end of the hereinbefore-mentioned pipe T 361 (FIG. 2A).

The chamber 74 of the break-in-two protection valve device 63 is connected by a passageway and corresponding pipe 388 to the left-hand end of a pipe T 389 the side outlet of which is connected by a pipe 390 to the hereinbefore-mentioned passageway 208 that extends through the pipe bracket 196 and the body 198 of the manually operated change-over valve device 15 and opens at the wall surface of the bore 201 in the body 198 at a location to the left of the location at which the passageway 209 opens at the wall surface of this bore a distance substantially equal to the length of the peripheral annular groove 222 on the spool-type selector valve 210. The other end of the pipe T 389 is connected by a pipe 391 to the side outlet of a double check valve device 392. The right-hand end of the double check valve device 392 is connected by a pipe 393 to one end of a pipe T 394 (FIG. 2A), the side outlet of which is connected by a pipe 395 to a volume reservoir 396, the purpose of which is to provide proper regulation of the operation of the relay valve device 346. The other end of the pipe T 394 has connected thereto a pipe and corresponding passageway 397 that extends through the pipe bracket 23 and casing section 29 of the brake control valve device 7 and opens at the wall surface of the bore 33. A branch passageway 397a having therein a choke 398 connects the passageway 397 to the chamber 31 above the diaphragm 27.

Since the main reservoir equalizing pipe 375 is normally charged to the pressure present in the first main reservoir 3, fluid under pressure will flow from the pipe 375 via the side outlet of the pipe T 374, pipe 373, pipe T 372, and pipe and corresponding passageway 371 to the chamber 370 of the selector valve device 345 on each of the locomotive units. Fluid under pressure thus supplied to the chamber 370 of the selector valve device 345 on each unit is effective to deflect the corresponding diaphragm 368 downward against the yielding resistance of the spring 377 to, through the intermediary of the stem 364 and fluted valve stem 357, unseat the valve 347 from the annular valve seat 363. In the unseated position of the valve 347, a communication is established between the chamber 348, which is connected via the passageway and corresponding pipe 349 and the pipe T 355 to the brake cylinder equalizing pipe 356, and the chamber 359, which is connected via the passageway and corresponding pipe 360 to the side outlet of the pipe T 361. The lower end of pipe T 361 is connected by a pipe and corresponding passageway 399 to a chamber 400 (FIG. 2B) in the relay valve device 346. The upper end of the pipe T 361 (FIG. 2A) is connected via the hereinbefore-mentioned pipe 387, pipe T 385, and pipe 386 to the passageway 209 that extends through the pipe bracket 196 and body 198 of the manually operated change-over valve device 15 and opens at the wall surface of the bore 201 in the body 198. While the spool-type selector valve 210 of the manually operative change-over valve device 15 on the leading locomotive unit A occupies its "Lead" position in which it is shown in FIG. 2, the peripheral annular groove 222 thereon establishes a communication between the passageway 209 and the passageway 208 which is connected via the pipe 390, pipe T 389, pipe 391, double check valve device 392, pipe 393, pipe T 394 (FIG. 2A) and pipe and passageway 397 to the service valve device 25 of the brake control valve device 7. Therefore, when the brake control valve device 7 on the leading unit A is operated in a manner hereinafter described in detail, it will affect the supply of fluid under pressure to the relay valve device 346 on the leading unit A of the multi-unit locomotive to cause a brake application on this leading unit and also affect the supply of fluid under pressure via the selector valve device 345 on this leading unit A to the brake cylinder equalizing pipe 356 on this unit which is connected by the usual hose and hose couplings to the corresponding brake cylinder equalizing pipe on the trailing units B and C to cause a brake application on these trailing units, in a manner hereinafter described in detail.

The relay valve device 346 (FIG. 2B) may be of any suitable self-lapping type and comprises a diaphragm 401 operatively connected to a supply and release valve mechanism for controlling the supply of fluid under pressure from a passageway and corresponding pipe 402 that is connected to the side outlet of the hereinbefore-mentioned pipe T 281 (FIG. 2A), the lower end of which is connected to the second main reservoir 4, in this manner hereinbefore described, to a passageway and corresponding pipe 403 which is connected to the brake cylinder device 2 on the respective locomotive unit.

In order to provide a source of fluid under pressure from which the brake control valve device 7 can supply fluid at the desired pressure to the relay valve device 346 to effect the operation thereof, a reducing valve device 404 (FIG. 2A) is included in the brake equipment of each of the locomotive units A, B, and C. A supply passageway in the reducing valve device 404 is connected by a pipe 405 to the side outlet of the hereinbefore-mentioned pipe T 335, which, as hereinbefore-mentioned, is connected via pipe 336, pipe cross 20, and pipe 19 having therein pipe T 21 to the second main reservoir 4. A delivery passageway in the reducing valve device 404 is connected by a pipe 406 to the side outlet of a pipe T 407, the upper end of which is connected by a pipe 408 and corresponding passageway that extends through the pipe bracket 23 and casing section 29 of the brake control valve device 7 to the chamber 34 in the casing section 29 so that this chamber is constantly supplied with fluid under pressure at the desired reduced pressure and at a rate determined by a service choke 409 disposed in this passageway and carried by the pipe bracket 23.

Assume that the brake equipment shown in FIGS. 2, 2A, and 2B is the brake equipment on the leading locomotive unit A shown in FIG. 1, and let it be supposed that the engineer desires to effect a service brake application on the entire train.

To manually effect a service application of brakes on each unit of the multi-unit locomotive and on the connected cars of a train, the engineer will move the brake valve handle 18 (FIG. 2) of the engineer's brake valve device 6 on the leading unit A arcuately from its "Release" position into a service zone (extending between "Release" position and "Full Service" position) an extent corresponding to the desired degree of service application. When the brake valve handle 18 is moved into the service zone, the self-lapping unit of the engineer's brake valve device 6 is operated to vent fluid under pressure from the fluid pressure brake pipe 1 to atmosphere via pipe T 331, pipe 330, pipe T 329, pipe 328, pipe T 327, pipe 326, pipe T 325, pipe 324, passageway 207 in pipe bracket 196 and body 198 of the manual change-over valve device 15, peripheral annular groove 221 on spool-type selector valve 210, passageway 206, pipe 22 and the self-lapping unit until the pressure in the fluid pressure brake pipe 1 is reduced a corresponding degree.

As the pressure in the fluid pressure brake pipe 1 is reduced, the pressure in the chamber 92 in the vacuum control valve device 11 (FIG. 2B) and the chamber 255 in the charging and break-in-two indication valve device 16 (FIG. 2A) is correspondingly reduced.

The reduction in the pressure in the chamber 92 of the vacuum control valve device 11 (FIG. 2B) renders the spring 156 effective, via the carriage pusher 154, to shift the cam carrier 108 and the cam element 114 pivotally mounted thereon in the direction of the left hand, it being understood that the cam carrier 108 is supported by the rollers 109 so that the left-hand end of the cam carrier 108 remains in abutting contact with the right-hand end of the operating stem 101 to thereby shift this stem and the diaphragm follower 97 in the direction of the left hand.

As the cam carrier 108 and the cam element 114 are thus shifted in the direction of the left hand, spring 145 is rendered effective to move the valve 141 downward away from the annular valve seat 146 so that an increased quantity of atmospheric air flows to the chamber 132 via the pipe 149, filter device 148, pipe and corresponding passageway 147, chamber 144, along the fluted stem 142 of the valve 141 and past this unseated valve. As the valve 141 is thus moved downward by the spring 145, it is effective via the valve tip 140, wear pin 139, valve pusher 135, spring 137, pusher sleeve 127, roller 126, pin 125, and cam lever 118 to maintain the roller 122 rotatably mounted on the pin 121 that is supported by the cam lever 118 in contact with the cam surface 123 on the cam element 114 so that the roller 122 rides down the cam surface 123 as the cam element 114 and cam carrier 108 are moved in the direction of the left hand by the spring 156 until the reduced pressure in the chamber 92 and acting on the effective area of the diaphragm 91 balances the force of the spring 156.

As the valve 141 is moved downward away from the annular valve seat 146, the filtered atmospheric air thus admitted to the chamber 132 flows to the vacuum brake pipe 10 via pipe 150, pipe T 151, pipe 170, chambers 171 and 175 in the vacuum brake release valve device 14 on the leading unit A, pipe 180, filter device 181, pipe 182 and pipe T 183.

Furthermore, as the valve 141 of the vacuum control valve device 5 moves away from the annular valve seat 146 to increase the degree of opening of this valve in response to the reduction of pressure in the chamber 92 resulting from the engineer moving the brake valve handle 18 of the engineer's brake valve device 6 to a position in its service zone corresponding to the desired degree of service application, more atmospheric air is admitted past the valve 141 per unit of time or per second, but the amount of atmospheric air flowing past the valve 141 decreases as the subatmospheric pressure in the vacuum brake pipe 10 increases. When the subatmospheric pressure in the vacuum brake pipe 10 is increased to a value corresponding to the reduction in pressure effected in the chamber 92 of the vacuum control valve device 11, the quantity of atmospheric air flowing past the valve 141 is equal to the quantity of atmospheric air that will be evacuated or exhausted by the exhauster via the orifice 191 in the quick release valve device 12. Therefore, the exhauster operates to evacuate or exhaust all of the atmospheric air that flows past the valve 141 to the chamber 132 in the vacuum control valve device 5. Consequently, there will be no further increase in the subatmospheric pressure in the vacuum brake pipe 10.

As filtered atmospheric air is admitted to the vacuum brake pipe 10, it will flow therefrom to the chamber 52 in the service valve device 25 of the brake control valve device 7 via pipe T 323 (FIG. 2), pipe 322, combined cut-out cock and strainer device 9, pipe 321, chambers 86 and 81 in the fluid pressure brake pipe operated cut-out valve device 8 (it being understood that in effecting a service brake application, the pressure in the fluid pressure brake pipe 1 which is present in the chamber 67 above the diaphragm 65 is not reduced sufficiently for the spring 71 to move the stem 73 upward to effect unseating of the valve 75 and render spring 87 effective to seat valve 84), pipe 340, pipe T 341, pipe 342, branch passageway 61a and passageway 61, it being understood that the flat disc-type valve 55 is pressed by a spring 56 against its seat 57 to prevent flow from the passageway 61 and chamber 60 to the chamber 51 via passageway 58 so that the subatmospheric pressure present in the chamber 51 is trapped therein.

The supply of atmospheric air to the chamber 52 below the diaphragm 28 in the manner just explained increases the pressure therein to a pressure that is in excess of the pressure in the chamber 51 above the diaphragm 28. Therefore, the higher pressure in the chamber 52 will deflect the diaphragm 28 in an upward direction and, through the intermediary of the pusher stem 53, move the valve stem 35 upward and cause the upper end of the valve stem 35 to first contact the bottom face of a flat disc valve 410 disposed in the chamber 34 and biased by a spring 411 against an annular valve seat 412 formed at the upper end of the bore 33 to close communication between the pipe and passageway 397 that opens at the wall surface of the bore 33 and atmosphere via passageway 44, peripheral annular groove 43, passageway 45 and brake cylinder exhaust choke 46. As the valve stem 35 continues to be moved upward, the flat disc valve 410 will be unseated from the annular valve seat 412. By unseating of the flat disc valve 410, fluid under pressure from the reducing valve device 404 is permitted to flow by way of pipe and passageway 406, pipe T 407, pipe and passageway 408, and the service choke 409 carried by the pipe bracket 23 and disposed in the passageway 408 to the chamber 34, thence past the now unseated flat disc valve 410 to the interior of the bore 33 from whence it flows to the passageway and pipe 397, pipe T 394, pipe 393, double check valve device 392 (FIG. 2), pipe 391, pipe T 389, pipe 390, passageway 208, peripheral annular groove 222 on the spool-type selector valve 210 of the manually operated change-over valve device 15 on the leading unit A, which valve device 15 now occupies the position shown in FIG. 2, passageway 209, pipe 386, pipe T 385, pipe 387, pipe T 361, and pipe and passageway 399 to the chamber 400 in the relay valve device 346 (FIG. 2B). Fluid under pressure also flows to the volume reservoir 396 via the side outlet of the pipe T 394 and pipe 395. The relay valve device 346 operates in response to the supply of fluid under pressure to the chamber 400 therein to effect the supply of a corresponding pressure to the brake cylinder device 2 on the leading unit A to cause an application of brakes on this unit.

Fluid under pressure flows from the passageway 397 in the brake control valve device 7 via branch passageway 397a and choke 398 to the chamber 31 and is effective to establish a force that acts in a downward direction on the upper side of the diaphragm 27. Upon this force slightly exceeding the force acting upward on the diaphragm 28 as a result of admitting atmospheric air to the chamber 52 caused by the reduction of pressure in the fluid pressure brake pipe 1, the valve stem 35 will be moved downward until the spring 411 seats the flat disc valve 410 on the annular valve seat 412. This cuts off flow of fluid under pressure from the reducing valve device 404 (FIG. 2A) to the relay valve device 346 (FIG. 2B) which, in turn, moves to a lap position to cut off flow of fluid under pressure to the brake cylinder device 2 on the leading unit A.

The chamber 132 in the vacuum control valve device 11 is connected to the vacuum exhauster via pipe 13, chambers 187 and 188 in the quick release valve device 12 which are now connected via the choke 191 since the valve 184 is now seated, pipe 189, vacuum reservoir 5 and pipe 190. Therefore, the exhauster will now operate to evacuate all the atmospheric air admitted past the valve 141 to the chamber 132 and the vacuum brake pipe 11 to maintain a subatmospheric pressure therein that corresponds to the reduced fluid pressure brake pipe pressure in the chamber 92 of the vacuum control valve device 11.

Consequently, after the pressure of fluid in the fluid pressure brake pipe 1 and the chamber 92 becomes stabilized at a value determined by the position in its service zone to which the engineer moved the handle 18 of the brake valve device 6 on the leading locomotive unit A, the subatmospheric pressure in the vacuum brake pipe 10 is correspondingly stabilized, whereupon, as hereinbefore explained, the brake control valve device 7 operates to cause the supply of fluid under pressure from the reducing valve device 404 to the relay valve device 346 to be terminated so that the relay valve device 346, in turn, moves to a lap position to correspondingly terminate the supply of fluid under pressure to the brake cylinder device 2 on the leading unit A. The seating of the flat disc valve 410 of the brake control valve device 7 on its annular valve seat 412 is effective to hold the desired pressure of fluid in the pipe 399 connected to the relay valve device 346 and hence in the brake cylinder device 2 on the leading unit A.

It will be understood that each vacuum type brake cylinder device on each car in the train will operate in response to the admittance of atmospheric air to the train vacuum brake pipe to effect a brake application on the respective car corresponding to the increase in subatmospheric pressure effected in the train vacuum brake pipe.

*Service application of brakes on trailing unit*

Let it now be assumed that the brake equipment shown in FIGS. 2, 2A, and 2B is the equipment on one of the trailing units B or C of the multi-unit locomotive shown in FIG. 1, it being understood that this unit is equipped with cast iron brake shoes and that the operation of the equipment on each trailing unit is the same. It will be further assumed that the spool-type selector valve 210 of the manual change-over valve device 15 on each trailing unit has been shifted axially from its "Lead" position in which it is shown in FIG. 2 in the direction of the right hand to its second or "Trail or Dead" position to condition the brake equipment on each trailing unit for trailing unit operation.

When the spool-type selector valve 210 is shifted in the manner hereinbefore explained to its "Trail or Dead" position, the passageway 203 in the pipe bracket 196 and body 198 of the change-over valve device 15 is connected to atmosphere, as hereinbefore explained, so that fluid under pressure is no longer supplied from the second main reservoir 4 to the chamber 278 in the fluid pressure operated vacuum brake release valve device 14 (FIG. 2B) on the respective trailing unit via the corresponding change-over valve device 15.

Furthermore, when the spool-type selector valve 210 is shifted to its "Trail or Dead" position, the peripheral annular groove 220 thereon establishes a communication between the passageway 204 and the passageway 205 which is closed by the blanking pad 224 that is secured to the bottom face of the pipe bracket 196, as hereinbefore explained.

Also, while the spool-type selector valve 210 is in its "Trail or Dead" position, the passageway 206 is cut off from the pasageway 207, and the passageway 208 is cut off from the passageway 209.

Fluid under pressure is now supplied from the main reservoir equalizing pipe 375 to the chamber 67 of the break-in-two protection valve device 63 on the leading unit A via pipe T 374, pipe 373, pipe T 372, and pipe and passageway 383. Consequently, the valve 75 of the break-in-two protection valve device 63 is maintained seated on its corresponding annular valve seat 77 to cut off communication between passageway and pipe 388 and passageway and pipe 384. Furthermore, the spool-type selector valve 210 is now in its "Trail or Dead" position in which pipe 390 and passageway 208 is cut off from passageway 209 and pipe 386. Therefore, it is apparent that operation of the relay valve device 346 on a trailing unit is no longer under the control of the brake control valve device 7 on the trailing unit.

However, on both the leading and trailing units, fluid under pressure is supplied from the main reservoir equalizing pipe 375 on the respective unit to the chamber 370 of the selector valve device 345 on the corresponding unit via pipe T 374, pipe 373, pipe T 372 and pipe and passageway 371. Fluid under pressure thus supplied to the chamber 370 of the selector valve device 345 on each respective unit is effective to deflect this diaphragm downward to, through the intermediary of the corresponding stem 364, effect unseating of the valve 347 of the selector valve device 345 on this unit.

Consequently, some of the fluid under pressure supplied by the brake control valve device 7 on the leading unit A to operate the relay valve device 346 on the leading unit will flow from the pipe 387 on the leading unit, via the pipe T 361, pipe and passageway 360, chamber 359, bore 358, past now unseated valve 347, chamber 348, passageway and pipe 349 and pipe T 355, to the brake cylinder equalizing pipe 356 on the leading unit. Since the brake cylinder equalizing pipe 356 on each unit is connected by hose and hose couplings to the brake cylinder equalizing pipe on each adjacent unit, fluid under pressure supplied to the brake cylinder equalizing pipe 356 on the leading unit A will flow to the brake cylinder equalizing pipe on each trailing unit. Fliud under pressure thus supplied to the brake cylinder equalizing pipe 356 on each respective trailing unit will flow therefrom vial pipe T 355, pipe and passageway 349, chamber 348, past the now unseated valve 347 of the selector valve device 345 on the respective trailing unit, bore 358, chamber 359, passageway and pipe 360, pipe T 361, and pipe and passageway 399 to the chamber 400 of the relay valve device 346 (FIG. 2B) on the respective trailing unit.

From the foregoing, it is apparent that fluid under pressure supplied by the brake control valve device 7 on the leading locomotive unit A to the relay valve device 346 on the leading unit A also flows via the selector valve device 345 on the leading unit A to the brake cylinder equalizing pipe 356 on the leading unit A and thence to the brake cylinder equalizing pipe 356 on the respective trailing unit from which it flows via the side outlet of pipe T 355 (pipe and passageway 349, the chambers 348 and 359 in the selector valve device 345 on the respective trailing unit, passageway and pipe 360, pipe T 361, and pipe and passageway 399 to the chamber 400 of the relay valve device 346 on the respective trailing unit so that this relay valve device 346 is operated thereby to supply fluid under pressure to the corresponding brake cylinder device 2 on the respective trailing unit to effect a brake application thereon.

The reduction in pressure in the fluid pressure brake pipe 1 effected by moving the handle 18 of the engineer's brake valve device 6 on the leading unit A from its "Release" position to a selected position in its service zone effects a corresponding reduction in pressure in the chamber 92 of the vacuum control valve device 11 on each respective trailing unit whereupon this vacuum control valve device 11 operates in the manner hereinbefore described to move the valve 141 further away from its corresponding annular valve seat 146 to thereby cause an increase in the amount of atmospheric air admitted to the chamber 132 and the pipes 150 and 13. However, the disc-shaped valve 172 in the vacuum brake release valve 14 on the respective trailing unit is seated at this time. Therefore, no atmospheric air is admitted to the vacuum brake pipe 10 on the respective trailing unit by operation of the vacuum control valve device 11 on the respective trailing unit. Consequently, operation of the vacuum brakes on the cars in the train are controlled solely by operation of the vacuum control valve device 11 on the leading locomotive unit A, it being remembered that the disc-shaped valve 172 of the vacuum brake release valve device 14 on the leading locomotive unit A is always unseated to establish a communication between the pipe 170 and the vacuum brake pipe 10 via chambers 171 and 175 in the vacuum brake release valve device 14, pipe 180, filter device 181, pipe 182 and pipe T 183.

*Release of a brake application*

To release a brake application on the locomotive comprising the units A, B, and C shown in FIG. 1 and the connected cars of a train coupled thereto, the handle 18 of the engineer's brake valve device 6 on the leading unit A is moved from the position it occupies in its service zone to its "Release" position for causing the fluid pressure brake pipe 1 to be recharged to its normal charged value.

The charging and break-in-two indication valve device 16 on the leading unit A operates in response to the increasing pressure in the fluid pressure brake pipe 1, in the manner hereinbefore described in detail, to supply fluid under pressure to the chamber 272 in the quick release valve device 12 on the leading unit A to effect unseating of the corresponding disc-shaped valve 184 whereupon a large capacity communication is established between the chambers 187 and 188.

Since the manually operated change-over valve device 15 on the leading unit A is in the position shown in FIG. 2, fluid under pressure is at this time supplied from the second main reservoir 4 to the chamber 278 in the vacuum brake release valve device 14 on the leading unit A, in the manner hereinbefore described, to effect unseating of the corresponding disc-shaped valve 172 and thereby establish a large capacity communication between the chambers 171 and 175.

The vacuum control valve device 11 on the leading unit A will operate in response to the supply of fluid under pressure from the fluid pressure brake pipe 1 to the chamber 92 thereof to move the valve 141 toward the annular valve seat 146 until the valve 141 occupies its minimum open position. As the valve 141 is thus moved toward its minimum open position, the amount of atmospheric air admitted to the chamber 132 via pipe 149, filter device 148, pipe and passageway 147, chamber 144 and bore 143 is correspondingly reduced. Since the disc-shaped valve 184 of the quick release valve device 12 and the disc-shaped valve 172 of the vacuum brake release valve device 14 on the leading unit A are unseated, as stated above, a large capacity communication is now established between the vacuum brake pipe 10 and the exhauster on the leading unit A via pipe T 183, pipe 182, filter device 181, pipe 180, chambers 175 and 171 in the vacuum brake release valve device 14 on the leading unit A, pipe 170, pipe T 151, pipe 150, chamber 132 in the vacuum control valve device 11 on the leading unit A, pipe 13, chambers 187 and 188 in the quick release valve device 12 on the leading unit A, pipe 189, vacuum reservoir 5 and pipe 190 so that the exhauster on the leading unit A operates to effect evacuation of the vacuum brake pipe 10 and the train vacuum brake pipe extending through the cars in the train.

Evacuation of the vacuum brake pipe 10 effects a corresponding evacuation of the chamber 52 in the brake control valve device 7 on the leading unit A, so that the pressure in the chamber 52 is reduced to the trapped subatmospheric pressure in the chamber 51. Evacuation of the chamber 52 renders the spring 40 effective to move the diaphragm 27 and the valve stem 35 downward whereupon the upper end of the valve stem 35 is moved away from the lower side of the flat disc valve 410 to the position shown in FIG. 2A. Upon movement of the valve stem 35 to the position shown in FIG. 2A, fluid under pressure is vented from the chamber 400 in the relay valve device 346 (FIG. 2B) on the leading unit A to atmosphere via passageway and pipe 399, pipe T 361, pipe 387, pipe T 385, pipe 386, passageway 209, peripheral annular groove 222 on the spool-type selector valve 210 of the manually operated changeover valve device 15 on the leading locomotive unit A, passageway 208, pipe 390, pipe T 389, pipe 391, double check valve device 392, pipe T 394, pipe and passageway 397, bore 33, passageway 44 in the valve stem 35, peripheral annular groove 43 on valve stem 35, passageway 45 and choke 46. Since the chamber 31 is connected via choke 398 and branch passageway 397a to the passageway 397, and the volume reservoir 396 is connected via pipe 395 and pipe T 394 to the pipe and passageway 397, the chamber 31 and the volume reservoir 396 are also vented to atmosphere. The relay valve device 346 on the leading locomotive unit A operates in response to venting of the chamber 400 therein to correspondingly vent fluid under pressure from the brake cylinder device 2 on the leading unit A to effect the release of the brakes on this unit.

Since the brake cylinder equalizing pipe 356 on the leading unit A is connected to the brake cylinder equalizing pipe 356 on the trailing units B and C and is also connected via pipe T 355, pipe and passageway 349, chambers 348 and 359 in the selector valve device 345 on the leading unit A, passageway and pipe 360 and pipe T 361 to the pipe 387 on the leading unit A, and the chamber 400 in relay valve device 346 on the respective trailing unit is connected via pipe and passageway 399, pipe T 361, pipe and passageway 360, chambers 359 and 348 in the selector valve device 345 on the respective trailing unit, passageway and pipe T 355, to the brake cylinder equalizing pipe 356 on the respective trailing unit, fluid under pressure will be released from the chamber 400 in the relay valve device 346 on the respective trailing units simultaneously as fluid under pressure is released from the chamber 400 in the relay valve device 346 on the leading unit A. Consequently, the relay valve device 346 on the respective trailing units B and C operate in response to this venting of fluid under pressure from the chamber 400 therein to release fluid under pressure from the corresponding brake cylinder device 2 to effect a release of the brakes on the respective trailing units B and C.

The vacuum control valve device 11 and the charging and break-in-two indication valve device 16 on each of the trailing units B and C will operate in response to an increase of pressure in the fluid pressure brake pipe 1 up to the normal charged value in a manner hereinbefore described in detail to respectively move the valve 141 of the vacuum control valve device 11 on the respective trailing unit in the direction of the annular valve seat 146, and to cause the quick release valve device 12 and the vacuum brake release valve device 14 on the respective trailing unit to operate to unseat their valves 184 and 172 from the corresponding valve seats 186 and 174 thereby to establish a communication between the exhauster on each respective trailing unit and the corresponding vacuum brake pipe 10 so that the exhausters on the trailing units B and C operate simultaneously with the exhauster on the leading unit A to assist in evacuating the train vacuum brake pipe to cause a release of the brakes on the cars in the train.

*Emergency application and release of brakes*

To effect an emergency application of brakes, the handle 18 of the engineer's brake valve device 6 on the leading locomotive unit A shown in FIG. 1 is moved to its "Emergency" position in which the vent valve device of the brake valve device 6 is opened to vent fluid under pressure from the fluid pressure brake pipe 1 at an emergency rate, it being understood that the brake valve device 6 will perform all the service operations hereinbefore described since the handle 18 is moved through the service application zone to its "Emergency" position.

Since the pressure in the fluid pressure brake pipe 1 is reduced to zero when an emergency application is made, the pressure in the chamber 67 (FIG. 4) of the cutout valve device 8 (FIG. 8) on each unit of the multi-unit locomotive is likewise reduced to zero whereupon the corresponding spring 71 is effective to deflect the diaphragm 65 and diaphragm follower 70 upward to the position shown in FIG. 4. As the diaphragm follower 70 moves upward to the position shown in FIG. 4, it is effective, through the intermediary of the stem 73 and forked connection 76, to move valve 75 upward thereby rendering spring 87 effective to seat valve 84 on valve seat 85 thereby closing communication between passageway and pipe 321, which is connected to the vacuum brake pipe 10 via combined cut-out cock and strainer device 9, pipe 322, and pipe T 323, and passageway and pipe 340. Subsequent to seating of valve 84 on valve seat 85, valve 75 is lifted from its seat 77. The chamber 74 is connected to the delivery passageway in the reducing valve device 404 (FIG. 2A) via pipe 338, pipe T 339, a pipe 413 connected at one end to the right-hand end of the pipe T 339 and at the opposite end to the lower end of the pipe T 407, pipe T 407, and pipe 406. Therefore, upon valve 75 being lifted from its seat 77, fluid under pressure flows from the reducing valve device 404 on each respective unit of the multi-unit locomotive to the chamber 52 below the diaphragm 28 of the brake control valve device 7 on the corresponding locomotive unit via pipe 406, pipe T 407, pipe 413, pipe T 339, pipe and passageway 338, chamber 74, past now unseated valve 75, through bore 83 to chamber 81 and thence through passageway and pipe 340, pipe T 341, pipe 342, branch passageway 61a and passageway 61.

Fluid under pressure also flows from the pipe T 341 via the pipe 343 to the left-hand end of the double check valve device 276 (FIG. 2B). Fluid under pressure thus supplied to the left-hand end of the double check valve device 276 on the trailing units B and C moves the check valve therein from its left-hand position to its right-hand position if it is not already in this position, whereupon fluid under pressure flows from the pipe 343 to the chamber 278 in the vacuum brake release valve device 14 on the respective trailing unit. Fluid under pressure thus supplied to the chamber 278 of the vacuum brake release valve device 14 on each trailing unit is effective to move the corresponding piston 178, piston rod 177 and valve 172 to unseat the valve 172 from the corresponding annular valve seat 174 thereby establishing a communication between the chambers 175 and 171.

It will be remembered that the valve 172 of the vacuum brake release valve device 14 on the leading unit A is unseated from its corresponding seat 174 since the change-over valve device 15 on the leading unit A is in its "Lead" position in which fluid under pressure is supplied from the second main reservoir 4 to the chamber 278 in the vacuum brake release valve device 14 on the leading unit A via pipe 19 having pipe T 21 therein, pipe cross 20, pipe 336, pipe T 335, pipe 334, pipe T 333, pipe 332, passageway 204, peripheral annular groove 220 on spool-type selector valve 210 of the change-over valve device 15, passageway 203, pipe 337, double check valve 274 (FIG. 2B), pipe 275, double check valve 276 and pipe 277.

The supply of fluid under pressure from the reducing valve device 404 on each unit of the multi-unit locomotive to the chamber 52 in the brake control valve device 7 on the respective locomotive unit establishes a differential fluid pressure force on the diaphragm 28 since a subatmospheric pressure is trapped in the chamber 51 above the diaphragm 28, which differential fluid pressure force is effective to operate the brake control valve device 7 on each respective unit in the manner hereinbefore described to supply fluid under pressure from the reducing valve device 404 on the respective unit to the corresponding pipe 391 which is connected via the pipe T 389 to the pipe and passageway 388 and to the pipe 390 and passageway 208. Since the chamber 67 of the break-in-two protection valve device 63 on each unit of the multi-unit locomotive is charged with fluid under pressure from the main reservoir equalizing pipe 375 on the respective unit via pipe T 374, pipe 373, pipe T 372 and pipe 383, the pipe and passageway 388 on each locomotive unit is cut off from the corresponding passageway and pipe 384 which is connected to the left-hand end of the pipe T 385. The spool-type selector valve 210 of the manually operative change-over valve device 15 on the trailing locomotive units B and C is in its "Trail or Dead" position. Therefore, the pipe 390 and passageway 208 on each trailing unit are cut off from the passageway 209 and pipe 386 which is connected to the side outlet of the pipe T 385 the right-hand end of which is connected to the chamber 400 in the relay valve device 346 on the respective trailing unit. Consequently, the brake control valve device 7 on each trailing unit is cut off from the corresponding relay valve device 346.

Since the spool-type selector valve 210 of the manually operative change-over valve device 15 on the leading unit A is in its "Lead" position in which the peripheral annular groove 222 on the valve 210 establishes a communication between the corresponding passageways 208 and 209, the fluid under pressure supplied from the reducing valve device 404 on the leading unit A to the chamber 52 in the brake control valve device 7 on this locomotive unit in the manner described above is effective to operate this brake control valve device 7 on the leading unit A in the manner hereinbefore described to effect the supply of fluid under pressure from the reducing valve device 404 on the leading unit A to the corresponding relay valve device 346 which is operated thereby to effect, in the manner hereinbefore described, the supply of fluid under pressure from the second main reservoir 4 on the unit A to the corresponding brake cylinder device 2. Part of the fluid under pressure supplied by the brake control valve device 7 on the leading unit A to the relay valve device 346 flows from the pipe 387 via pipe T 361, pipe and passageway 360, chamber 359, bore 358, chamber 348, and pipe and passageway 349 in the selector valve device 345 on the leading unit A, and pipe T 355 to the brake cylinder equalizing pipe 356 on the leading unit A. Since the brake cylinder equalizing pipe 356 on the leading unit A is connected by means of hose and hose couplings to the corresponding brake cylinder equalizing pipe on the trailing unit B, which pipe is likewise connected to the corresponding pipe on trailing unit C, fluid under pressure supplied to the brake cylinder equalizing pipe 356 on the leading unit A will flow to the brake cylinder equalizing pipe 356 on each of the trailing units B and C. Fluid under pressure thus supplied to the brake cylinder equalizing pipe 356 on each trailing unit will flow therefrom via the corresponding pipe T 355, pipe and passageway 349, chamber 348, bore 358, chamber 359, and passageway and pipe 360 in the selector valve device 345 on the respective trailing unit, pipe T 361, and pipe and passageway 399 to the chamber 400 in the self-lapping relay valve device 346 on the respective trailing unit to operate this relay valve device to effect the supply of fluid under pressure, in the manner hereinbefore described in detail, to the corresponding brake cylinder device 2 to effect an application of the brakes on the respective trailing unit.

The reduction in pressure in the fluid pressure brake pipe 1 to zero effects a corresponding reduction in the pressure in the chamber 92 of the vacuum control valve device 11 on each of the three units of the multi-unit locomotive whereupon the vacuum control valve device 11 on each unit operates in a manner hereinbefore described to move the corresponding valve 141 downward away from its annular valve seat 146 to its maximum open position. As the valve 141 in the vacuum control valve device 11 on each unit of the multi-unit locomotive is thus removed to its maximum open position, atmospheric air is admitted to the vacuum brake pipe 10 via each one of the vacuum brake control valve devices 11 in the manner hereinbefore described. Since the vacuum brake pipe 10 is connected to the train vacuum brake pipe, the atmospheric air admitted by each one of the vacuum control valve devices 11 rapidly raises the pressure in the train vacuum brake pipe to atmospheric pressure and effects a full service application of brakes on each car in the train.

An emergency application of brakes is released in the same manner as hereinbefore described in connection with a release of a service brake application.

*Independent application and release of locomotive brakes*

A self-lapping type independent brake valve device 414 (FIG. 2) has a supply passageway that is connected by a pipe 415 to the upper end of the hereinbefore-mentioned pipe T 333, the lower end of which pipe T 333 is connected to the second main reservoir 4 via pipe 334, pipe T 335, pipe 336, pipe cross 20, and pipe 19 having therein pipe T 21. The self-lapping type independent brake valve device 414 also has a delivery passageway that is connected by a pipe 416 to the left-hand end of the hereinbefore-mentioned double check valve device 392.

Since the side outlet of the double check valve device 392 is connected to the chamber 400 in the relay valve device 346 via the pipe 391, pipe T 389, pipe 388, chambers 74 and 81 in the break-in-two protection valve device 63, passageway and pipe 384, pipe T 385, pipe 387, pipe T 361, and pipe and passageway 399, it may be noted that the independent brake valve device 414 is thus connected to the relay valve device 346 in bypass of the manually operated change-over valve device 15 thus insuring that the brakes on the respective locomotive unit can always be controlled by the independent brake valve device 414 regardless of whether or not the manually operated change-over valve device 15 is in its "Lead" position or in its "Trail or Dead" position.

The quick release valve device of the independent brake valve device 414 is connected by a pipe 417 to the side outlet of a pipe T 418. One end of the pipe T 418 is connected by a pipe 419 to a vacuum control reservoir 420 and the opposite end is connected by a pipe and passageway 421 to the passageway 58 that opens into the chamber 51 above the diaphragm 28 of the brake control valve device 7. The purpose of the vacuum control reservoir 420 is to control equalization of pressures between the chambers 52 and 51 of the brake control valve device 7 when effecting an independent release of an automatic application of the locomotive brakes, in a manner hereinafter described.

To effect an independent service application of the brakes on the units A, B, and C of the multi-unit locomotive only, the engineer will move a handle 422 of the independent brake valve device 414 on the leading unit A arcuately from a "Release" position into a service zone an extent corresponding to the degree of service application desired. When the brake valve handle 422 is moved into the service zone, the self-lapping unit of the independent brake valve device 414 is operated to effect the supply of fluid under pressure from the second main reservoir 4 via pipe 19 having pipe T 21 therein, pipe cross 20, pipe 336, pipe T 335, pipe 334, pipe T 333, pipe 415, to the pipe 416 from whence it flows to the chamber 400 of the relay valve device 346 on the leading unit A via the double check valve device 392, pipe 391, pipe T 389, pipe 390, passageway 208, peripheral annular groove 222 on the spool-type selector valve 210 of the manually operated change-over valve device 15 on the leading unit A, passageway 209, pipe 386, pipe T 385, pipe 387, pipe T 361, and pipe and passageway 399. The relay valve device 346 on the leading unit A now operates in a manner hereinbefore described to supply fluid under pressure from the corresponding second main reservoir 4 to the brake cylinder device 2 on the leading unit A to apply the brakes on this unit.

Part of the fluid under pressure supplied to the pipe 387 in the manner just described flows via the side outlet of the pipe T 361, pipe and passageway 360, chamber 359, bore 358, chamber 348, and passageway 349 of the selector valve device 345 on the leading unit A to the pipe T 355 which is disposed in the brake cylinder equalizing pipe 356 on the leading unit A. Brake cylinder equalizing pipe 356 on the leading unit A is connected by the usual hose and hose couplings to the brake cylinder equalizing pipe 356 on the trailing units B and C so that fluid under pressure supplied to the brake cylinder equalizing pipe 356 on the leading unit A flows to the brake cylinder equalizing pipe 356 on each of the trailing units B and C. Fluid under pressure supplied to the brake cylinder equalizing pipe 356 on each of the respective trailing units, in the manner described above, flows via the side outlet of the pipe T 355 which is disposed in the brake cylinder equalizing pipe 356, pipe and passageway 349, chamber 348, bore 358, chamber 359, and pipe and passageway 360 of the selector valve device 345 on the respective trailing unit, pipe T 361 and pipe and passageway 399 to the chamber 400 in the respective relay valve device 346. Fluid under pressure thus supplied to the chamber 400 of the relay valve device 346 on the respective trailing units B and C operates each relay valve device to effect the supply of fluid under pressure from the corresponding second main reservoir 4 to the brake cylinder device 2 on the respective trailing unit to effect an application of the brakes thereon.

To release the independent application of the brakes on the units A, B, and C of the multi-unit locomotive, the engineer will move the handle 422 of the independent brake valve device 414 on the leading unit A from the position it occupies in its service zones to its "Release" position. As the handle 422 is thus moved from the position it occupies in its service zone toward and to its "Release" position, the self-lapping unit of the independent brake valve device 414 on the leading unit A operates to correspondingly vent fluid under pressure from the chamber 400 of the relay valve device 346 on each of the three units A, B and C whereupon the respective relay valve device 346 operates to vent fluid under pressure from the brake cylinder device 2 on the corresponding unit to effect a release of the brakes on this unit of the multi-unit locomotive.

Let it be supposed that an automatic service application of the brakes has been effected on the three units A, B, and C of the multi-unit locomotive and on the cars in the train by the engineer moving the handle 18 of the engineer's automatic brake valve device 6 on the leading unit A from its "Release" position arcuately into the service zone an extent corresponding to the degree of service brake application desired, and that, subsequent to thus effecting an automatic service brake application, the engineer desires to effect a quick release of the brakes on the units A, B, and C of the multi-unit locomotive only.

To effect a quick release of the brakes on the multi-unit locomotive only, the engineer will now move the handle 422 of the independent brake valve device 414 on the leading unit A from its "Release" position arcuately, in a direction opposite to the direction in which the handle 422 is moved to effect an independent brake application, to a "Quick Release" position. When the handle 422 is moved to it "Quick Release" position, the quick release valve of the independent brake valve device 414 establishes a communication between a pipe 423 which is connected to the side outlet of the hereinbefore-mentioned pipe T 339 and pipe 417. Since the right-hand end of the pipe T 339 is connected via the pipe 413, pipe T 407, and pipe 406 to the outlet passageway of the reducing valve device 404, fluid under pressure will now be supplied by the reducing valve device 404 to the pipe 417 which is connected to the side outlet of the pipe T 418 (FIG. 2A), the upper end of which is connected via the pipe and passageway 421 to the chamber 51 above the diaphragm 28 of the brake control valve device 7. Since subatmospheric pressure is present in the chamber 52 below the diaphragm 28, the supply of fluid under pressure to the chamber 51 above the diaphragm 28 deflects the diaphragm 28 downward to render the spring 40 effective to move the valve stem 35 and the diaphragm 27 downward to the position shown in FIG. 2A.

As the valve stem 35 is moved downward by the spring 40, the upper end of the valve stem 35 is moved away from the lower side of the flat disc valve 410 which is maintained against the annular valve seat 412 by the spring 411. Upon movement of the upper end of the valve stem 35 away from the lower side of the flat disc valve 410, the chamber 400 in the relay valve device 346 on each locomotive unit is connected to atmosphere. The chamber 400 in the relay valve 346 on the leading unit A is connected to atmosphere via the passageway and pipe 399, pipe T 361, pipe 387, pipe T 385, pipe 386, passageway 209, peripheral annular groove 222 on the spool-type selector valve 210 of the change-over valve device 15 on the leading unit A, passageway 208, pipe 390, pipe T 389, pipe 391, double check valve device 392, pipe 393, pipe T 394, pipe and passageway 397, bore 33, passageway 44 in valve stem 35, peripheral annular groove 43 on valve stem 35, passageway 45 and brake cylinder exhaust choke 46.

The relay valve device 346 on the leading unit A operates in response to the venting of fluid under pressure from the chamber 400 thereof to effect the release of fluid under pressure from the corresponding brake cylinder device 2 to release the brakes on the leading unit A.

The chamber 400 in each of the relay valve devices 346 on the trailing units B and C is connected in the manner hereinbefore described in detail via the selector valve device 345 on the respective trailing unit to the corresponding brake cylinder equalizing pipe 356. The brake cylinder equalizing pipe 356 on the two trailing units B and C is connected together by the usual hose and hose couplings, and the brake cylinder equalizing pipe 356 on the trailing unit B is connected to the brake cylinder equalizing pipe 356 on the leading unit A by the usual hose and hose couplings. The brake cylinder equalizing pipe 356 on the leading unit A is connected via the selector valve device 345 on the leading unit A to the pipe 387 on this unit. Therefore, fluid under pressure will be vented from the chamber 400 in the relay valve device 346 on each of the trailing units B and C simultaneously as fluid under pressure is released from the chamber 400 in the relay valve device 346 on the leading unit A. Consequently, the relay valve device 346 on each of the trailing units B and C will operate to release fluid under pressure from the corresponding brake cylinder device 2 to effect a release of the brakes on the respective trailing unit.

*Break-in-two protection feature*

(a) *Break-in-two of any two cars in the train.*—The break-in-two protection feature provides an automatic application of the fluid pressure brakes on the locomotive and of the vacuum brakes on the cars, cutoff of locomotive power, and the sounding of an alarm in the event of rupture of the train vacuum brake pipe hose, such as due to break-in-two of the train.

If, with the brake valve handle 18 of the engineer's brake valve device 6 on the leading locomotive unit A in its "Release" position and the apparatus on all three locomotive units charged in the manner described in connection with initial charging so that the brakes on the multi-unit locomotive and on the cars in the train coupled thereto are released, a hose connection in the train vacuum brake pipe extending from car to car in the train and connected between two adjacent cars is parted or ruptured, as, for example, from a break-in-two of the train, the resulting admission of atmospheric air to the train vacuum brake pipe will cause a full service application of the vauum brakes on the parted cars and also on the still connected cars and locomotive.

Subsequent to a break-in-two of the train, atmospheric air will flow from the point of rupture of the train vacuum brake pipe to the chamber 296 above the diaphragm 289 in the charging and break-in-two indication valve device 16 on the leading locomotive unit A via the train vacuum brake pipe extending through the cars in the train between the point of rupture and the multi-unit locomotive, the locomotive vacuum brake pipe 10, pipe T 183 on the leading unit A, pipe 182, filter device 181, pipe 180, chambers 175 and 171 in the vacuum brake release valve device 14 (since valve 172 is always unseated on the leading unit A), pipe 170, pipe T 151, and pipe and passageway 298. Since atmospheric air cannot flow from the passageway 298 to the chamber 297 below the diaphragm 289 via the short passageway 299, counterbore 300, passageway 312, combined choke and strainer device 313, port 311, and passageway 310 as fast as it is flowing to the chamber 296 above the diaphragm 289, a pressure differential is established on the opposite sides of the diaphragm 289 which is effective to deflect this diaphragm downward and thereby move the break-in-two protection valve 286 downward until the upper O-ring 317 carried thereby is disposed below the location at which the passageway 279 opens at the wall surface of the counterbore 280. Upon the break-in-two protection valve 286 being moved to the above-described position, fluid under pressure from the second main reservoir 4 on the leading unit A, which is connected to the passageway 279 via pipe 19 having pipe T 21 therein, pipe cross 20, pipe 282, pipe T 281, pipe and passageway 234, and peripheral annular groove 262 on spool-type charging valve 235, flows to the fluid pressure operated emergency relay valve device 17 via the counterbore 280, passageway and pipe 285, pipe T 285a and the short pipe 285b. The right-hand end of the pipe T 285a is connected by a pipe 424 to the side outlet of a pipe T 425, the left-hand end of which is connected by a pipe 426 to a power cut-out switch device 427 that is effective to cut off power to the driving motors of the corresponding locomotive unit, and the right-hand end of the pipe T 425 is connected by a pipe 428 to a whistle device 429. Therefore, part of the fluid under pressure supplied to the pipe 285 flows to the power cut-out switch device 427 and to the whistle device 429 so that simultaneously the relay valve device 17 operates to vent fluid under pressure from the fluid pressure brake pipe 1 at an emergency rate, the switch device 427 operates to cut off the supply of power to the driving motors of the leading locomative unit A, and the whistle device 429 on this unit sounds an alarm.

Operation of the relay valve device 17 on the leading unit A to vent fluid under pressure from the fluid pressure brake pipe 1 at an emergency rate effects a corresponding reduction in pressure at an emergency rate in the chamber 67 of the fluid pressure brake pipe operated cut-out valve device 8, in the chamber 92 of the vacuum control valve device 11, and in the chamber 255 of the charging and break-in-two indication valve device 16 on each unit of the multi-unit locomotive until the pressure in each of these chambers is reduced to zero or atmospheric pressure.

The above-mentioned reduction in pressure in the chamber 67 of the fluid pressure brake pipe operated cut-out valve device 8 on each unit of the multi-unit locomotive renders the corresponding spring 71 effective, through the intermediary of the stem 73 and forked connection 76, to move the valve 75 upward from the corresponding annular valve seat 77 whereupon the spring 87 is rendered effective to seat valve 84 on its corresponding annular valve seat 85 to close communication between the passageway and pipe 321 and the passageway and pipe 340 thereby cutting off the brake control valve device 7 on each respective unit of the muti-locomotive from the vacuum brake pipe 10.

Unseating of the valve 75 from the annular valve seat 77 establishes a communication between the chamber 74, which is connected to the delivery passageway in the reducing valve device 404 on the respective unit via passageway and pipe 338, pipe T 339, pipe 413, pipe T 407, and pipe 406, and the chamber 81, which is connected via the passageway and pipe 340, pipe T 341, pipe 342, branch passageway 61a, and passageway 61 of the chamber 52 in the brake control valve device 7 on the respective locomotive unit. Since the right-hand end of the pipe T 341 is connected to the chamber 278 in the vacuum brake release valve device 14 on the corresponding locomotive unit via pipe 343, double check valve device 276 and pipe 277, fluid under pressure will now be supplied from the reducing valve device 404 on each locomotive unit simultaneously to the chamber 52 in the corresponding brake control valve device 7 and to the chamber 278 in the vacuum brake release valve device 14 on each of the training units B and C.

The supply of fluid under pressure from the reducing valve device 404 on each locomotive unit to the chamber 52 in the corresponding vacuum brake control valve device 7 operates this valve device to affect the supply of fluid under pressure from the reducing valve device 404 on the respective unit to the corresponding pipes 388 and 390. On each of the locomotive units A, B, and C, the corresponding break-in-two protection valve device 63 maintains the pipe 388 cut off from the pipe 384, and on each of the trailing units B and C, the corresponding change-over valve device 15, which is in its "Trail or Dead" position maintains the pipe 390 cut off from the pipe 386. Since the change-over valve device 15 on the leading unit A is in its "Lead" position, the peripheral annular groove 222 on the spool-type selector valve 210 of this change-over valve device establishes a communication between the pipe 390 that is connected to the passageway 208 and the pipe 386 that is connected to the passageway 209. Therefore, fluid under pressure supplied by the brake control valve device 7 on the leading unit A to the pipe 390 on this unit flows to the chamber 400 in the corresponding relay valve device 346 via passageway 208, peripheral annular groove 222, passageway 209, pipe 386, pipe T 385, pipe 387, pipe T 361 and pipe and passageway 399. Some of the fluid under pressure supplied to the pipe 387 flows via the side outlet of the pipe T 361, the selector valve device 345 on the leading unit A, pipe 349 and pipe T 355, to the brake cylinder equalizing pipe 356 on the leading unit A and thence to the pipe 356 on each of the trailing units B and C from whence it flows via the selector valve device 345 on the respective trailing unit to the chamber 400 in the relay valve device 346 on the respective trailing unit. The relay valve device 346 on each of the locomotive units A, B, and C will now operate in response to the fluid under pressure supplied thereto to effect the supply of fluid under pressure to the corresponding brake cylinder device 2 to cause a full service application of brakes on the respective unit so that the brakes on each of the units A, B, and C are applied substantially simultaneously.

The supply of fluid under pressure from the reducing valve device 404 on each trailing unit to the chamber 278 in the corresponding vacuum brake release valve device 14 moves the piston 178 and piston rod 177 upward to effect unseating of the valve 172 from the corresponding annular valve seat 174 to establish a communication between the chambers 171 and 175 in this valve device.

The reduction in pressure in the chamber 92 of the vacuum control valve device 11 on each unit of the multi-unit locomotive renders the corresponding springs 145 and 156 effective to move the valve 141 to its fully open position to thereby admit a maximum amount of atmospheric air to the chamber 132 from whence it flows to the vacuum brake pipe 10 via pipe 150, pipe T 151, pipe 170, chambers 171 and 175 in the corresponding vacuum brake release valve device 14, pipe 180, filter device 181, pipe 182 and pipe T 183.

The above-described operation of the vacuum control valve device 11 and vacuum brake release valve device 14 on each unit of the multi-unit locomotive to admit atmospheric air to the vacuum brake pipe 10 and, therefore, the train vacuum brake pipe extending from the locomotive through those cars between the locomotive and the point of rupture, at which point atmospheric air is also being admitted to the train vacuum brake pipe, effects a rapid build-up of pressure in the train vacuum brake pipe to atmospheric pressure which causes the brakes on those cars between the locomotive and the point of rupture to be applied in a minimum of time which is less than that required with hitherto known multi-unit locomotive vacuum brake equipments in which the equipment on only the leading unit operated to supply atmospheric air to the train vacuum brake pipe subsequent to a rupture of the train vacuum brake pipe or a break-in-two of the train which necessarily results in rupture of the train vacuum brake pipe.

The above-mentioned reduction in pressure at an emergency rate in the chamber 255 of the charging and break-in-two indication valve device 16 on each unit of the multi-unit locomotive in response to operation of the corresponding relay valve device 17 to vent fluid under pressure from the fluid pressure brake pipe 1 is effective to deflect the diaphragm 238 upward to effect movement of the spool-type charging valve 235 upward to a position in which the peripheral annular groove 262 thereon closes communication between the passageways 234 and 279 thereby cutting off the supply of fluid under pressure from the second main reservoir 4 on the respective locomotive unit to the corresponding fluid pressure operated emergency relay valve device 17, power cut-out switch device 427, and whistle device 429. Subsequent to movement of the spool-type charging valve 235 to the position in which communication is closed between passageways 234 and 279, the pipe and passageway 285 will be vented to atmosphere via the counterbore 280, short passageway 283 and choke plug 284. The fluid pressure operated emergency relay valve device 17 is connected to the pipe 285 via short pipe 285b and pipe T 285a; the power cut-out switch device 427 is connected to the pipe 285 via pipe 426, pipe T 425, pipe 424 and pipe T 285a; and the whistle device 429 is connected to the pipe 424 via pipe 428 and pipe T 425. Therefore, fluid under pressure will be vented from these devices to atmosphere subsequent to the cutoff of the supply of fluid under pressure to the passageway 279 whereupon the fluid pressure operated emergency relay valve device 17 operates to cut off venting of fluid under pressure from the fluid pressure brake pipe 1, and the whistle ceases to sound an alarm. The power cut-out switch device 427 is not reclosed until the throttle is returned to idling position.

Subsequent to operation of the emergency relay valve device 17 to cut off venting of fluid under pressure from the fluid pressure brake pipe 1, repair of the ruptured train vacuum brake pipe, and recoupling of the adjacent cars at the point of break-in-two of the train, the brakes on the locomotive and train of cars coupled thereto can be released.

(b) *Break-in-two of two adjacent locomotive units.—* Let it be supposed that a break-in-two occurs between the trailing units B and C, which break-in-two, of course, ruptures the hose connections between trailing units B and C of (1) the fluid pressure brake pipe 1, (2) main reservoir equalizing pipe 375, (3) brake cylinder equalizing pipe 356, and (4) vacuum brake pipe 10.

Fluid under pressure is released from the main reservoir equalizing pipe 375 to atmosphere upon a break-in-two between units B and C at a rate faster than fluid under pressure can be supplied to the main reservoir equalizing pipe 375 from the first main reservoir 3 on the respective units A, B, and C via the corresponding choke 382 (FIG. 2A). Therefore, fluid under pressure is released from the chamber 370 in each respective selector valve device 345 to atmosphere via the corresponding passageway and pipe 371, pipe T 372, pipe 373, pipe T 374, and the point of rupture of the main reservoir equalizing pipe 375. Consequently, the spring 377 moves the diaphragm follower head 367 and the diaphragm 368 upward to the position in which they are shown in FIG. 2A, thereby rendering the spring 362 effective to seat the valve 347 on its corresponding valve seat 363.

(i) *Application of brakes on leading unit A.—* At the time of the break-in-two between trailing units B and C, the valve 347 in the selector valve device 345 on each of the three units A, B, and C is unseated to thereby establish a communication between the pipe and passageway 360 which is connected via the pipe T 361 and the pipe and passageway 399 to the chamber 400 in the relay valve device 346 on the respective unit, and the passageway and pipe 349 which is connected via the pipe T 355 to the brake cylinder equalizing pipe 356 on the respective unit. Therefore, when the main reservoir equalizing pipe 375 is vented to atmosphere as a result of the break-in-two between the units B and C, the chamber 370 in the selector valve device 345 on each of the units A, B, and C is vented to atmosphere at the point of rupture, thereby rendering the spring 362 effective to seat the valve 347 in each selector valve device 345 on its corresponding seat 363 to thereby close communication between the pipe and passageway 360 and pipe and passageway 349. Accordingly, operation of the relay valve device 346 on the leading unit A will now be effective to supply fluid under pressure to the corresponding brake cylinder device 2, but the fluid under pressure supplied for operating the relay valve device 346 on the leading unit A will not be supplied to the brake cylinder equalizing pipe 356 for operating the relay valve devices 346 on the trailing units B and C.

Upon occurrence of the break-in-two between trailing units B and C, fluid under pressure is vented at an emergency rate from the chamber 67 of the cut-out valve device 8 on the leading unit A to atmosphere via passageway and pipe 344, pipe T 325, pipe 326, pipe T 327, pipe 328, pipe T 329, pipe 330, pipe T 331, and the point of rupture of the fluid pressure brake pipe 1. Therefore, the cut-out valve device 8 on the leading unit A will operate in the manner hereinbefore described to effect the supply of fluid under pressure from the reducing valve device 404 on the leading unit A to the chamber 52 in the brake control valve device 7 on the leading unit A and to the chamber 278 in the vacuum brake release valve device 14.

The brake control valve device 7 on the leading unit A now operates in the manner hereinbefore described to supply fluid under pressure from the reducing valve device 404 on the leading unit A to the corresponding relay valve device 346 via the manually operated change-over valve device 15 on the leading unit A which is now in its "Lead" position in which the peripheral annular groove 222 on the spool-type selector valve 210 establishes a communication between the passageways 208 and 209 whereby fluid under pressure supplied from the brake control valve device 7 flows to the chamber 400 of the relay valve device 346 on the leading unit A. The relay valve device 346 on the leading unit A operates in response to the fluid under pressure supplied to the chamber 400 therein to effect a full service brake application on only the leading unit A, since no fluid under pressure supplied to the chamber 400 can flow through the selector valve device 345 on the leading unit A to the brake cylinder equalizing pipe 356 since the valve 347 of the selector valve device 345 is now seated, as hereinbefore explained.

(ii) *Application of brakes on trailing unit B or C.—* Prior to a break-in-two, the valve 347 of the selector valve device 345 on each respective trailing unit is unseated, as has been hereinbefore explained.

At the time of the break-in-two, each valve 347 will be seated on its corresponding seat 363 by the spring 362, as shown in FIG. 2A, as a result of the rupture of the main reservoir equalizing pipe 375 venting fluid under pressure from chamber 370.

Also, at the time of the break-in-two, fluid under pressure will be vented from the chamber 67 in the break-in-two protection valve device 63 on each of the trailing units B and C to atmosphere via pipe 383, pipe T 372, pipe 373, pipe T 374 and the main reservoir equalizing pipe 375 at the point of rupture of this pipe. Upon venting of fluid under pressure from the chamber 67 in the break-in-two protection valve device 63 on each of the trailing units B and C, as explained above, the spring 71 effects unseating of the corresponding valve 75 and the spring 87 effects seating of the corresponding valve 84, thereby establishing a communication between the chambers 74 and 81 in each break-in-two protection valve device 63 on the trailing units B and C.

The rupture of the fluid pressure brake pipe 1 between the trailing units B and C effects a reduction in pressure to zero in the chamber 67 of the cut-off valve device 8 on each unit of the multi-unit locomotive, whereupon the cut-off valve device 8 on each of the trailing units B and C operates, as hereinbefore described, to effect the supply of fluid under pressure from the reducing valve device 404 on the respective trailing unit to the chamber 52 in the brake control valve device 7 on the corresponding trailing unit. This supply of fluid under pressure to the chamber 52 is effective to operate the control valve device 7 on the respective trailing unit to effect the supply of fluid under pressure from the corresponding reducing valve device 404 to the corresponding passageway and pipe 397 from whence it flows to the chamber 400 in the relay valve device 346 on the respective trailing unit via pipe T 394, pipe 393, double check valve device 392, pipe 391, pipe T 389, pipe 388, chambers 74 and 81 in the break-in-two protection valve device 63 on the respective trailing unit, pipe 384, pipe T 385, pipe 387, pipe T 361, and pipe and passageway 399. Fluid under pressure thus supplied to the chamber 400 in the relay valve device 346 on the respective trailing unit operates this relay valve device to effect the supply of fluid under pressure to the corresponding brake cylinder device 2 to apply the brakes on the respective trailing unit.

If a break-in-two occurs between the units A and B, the units A, B, and C operate in the same manner as has been described for a break-in-two between units B and C.

Description—FIG. 5

According to a second embodiment of the invention, a double diaphragm self-lapping relay valve device 430, which is shown in FIG. 5, replaces the single diaphragm self-lapping relay valve device 346, shown in FIG. 2B, to provide a brake equipment for a unit of a multi-unit locomotive, which unit is equipped with composition type brake shoes. This brake equipment functions substantially the same as the brake equipment shown in FIGS. 2, 2A, and 2B, it being understood that this brake equipment for a locomotive unit equipped with composition type brake shoes is, with the exception of the double diaphragm self-lapping relay valve device 430 shown in FIG. 5, substantially identical to the brake equipment shown in FIGS. 2, 2A, and 2B. Accordingly, like reference numerals have been used to designate the structure shown in FIG. 5 which is identical with that shown in FIGS. 2, 2A, and 2B and already described. Only such features of the structure and operation of the second embodiment of the invention as shown in FIG. 5 which differ from that of the first embodiment shown in FIGS. 2, 2A, and 2B will be hereinafter described.

According to the embodiment of the invention shown in FIG. 5, the double diaphragm self-lapping relay valve device 430 comprises a sectionalized casing embodying three casing sections 431, 432, and 433, and two coaxially arranged movable abutments or diaphragms 434 and 435 of different effective areas cooperatively, though not positively, connected so as to constitute a stack, as will be understood from subsequent description. The outer periphery of the larger diaphragm 435 is clamped between the casing sections 431 and 432 which are secured together by any suitable means (not shown).

The diaphragm 435 cooperates with the casing sections 431 and 432 to form within the relay valve device 430 and on opposite sides of the diaphragm a first pair of chambers 436 and 437, the latter being open to atmosphere via a passageway 438 that extends through the casing sections 432 and 431.

The casing section 431 of the double diaphragm self-lapping relay valve device 430 is provided with a bore 439 which opens at one end into a chamber 440 formed by the cooperative relationship between the upper end of the casing section 431 and a cover member 441 secured to the casing section 431 by any suitable means (not shown). The opposite end of the bore 439 opens into the chamber 436. The casing section 431 is provided intermediate the ends of the bore 439 with two annular chambers 442 and 443 which are disposed in spaced-apart relation along the length of the bore 439. Slidably mounted in the bore 439 is a valve stem 444, the lower end of which is provided with a portion of reduced diameter which extends through two diaphragm followers 445 and 446 disposed on opposite sides of the diaphragm 435. This portion of reduced diameter of the stem 444 is screw threaded to receive a nut 447 that has screw-threaded engagement therewith to operatively connect the center of the diaphragm 435 to the diaphragm followers 445 and 446, and to the valve stem 444. Disposed within the chamber 436 between the casing section 431 and the diaphragm follower 445 and in surrounding relation to the valve stem 444 is a spring 448 for biasing the valve stem 444 and the diaphragm 435 in a downward direction.

The valve stem 444 is provided with two identical spaced-apart peripheral annular grooves in each of which is disposed an O-ring 449 to prevent leakage of fluid under pressure between the periphery of the valve stem and the wall of the bore 439, and between the chambers 442, 443, and 436. The valve stem 444 is formed intermediate its ends with a crossbore which, as shown in FIG. 5 illustrating the relative positions of the parts of the double diaphragm self-lapping valve device 430 in the brake release position, is so located that the upper end of the bore 439 is open to atmosphere via a passageway 450 extending from the upper end of the valve stem 444 longitudinally therethrough to the location thereon of the crossbore and thence via the crossbore and the chamber 443 which is open to an exhaust port 451 formed in the casing section 431.

A flat disc valve 452 is disposed in the chamber 440 and controls communication between chamber 440 that is supplied with fluid under pressure from the second main reservoir 4 via the pipe and passageway 402, and the chamber 442 which is connected by a passageway and corresponding pipe 453 to a brake cylinder device 454 which may be identical to the brake cylinder device 2 shown in FIG. 2B. Coaxially arranged with the flat disc valve 452 and operatively connected thereto is a piston 455 which is sealingly slidable within a bore 456 formed in the cover member 441 which bore 456 is coaxial with the bore 439 in the casing section 431.

A spring 457, interposed between the piston 455 and the cover member 441, urges the piston 455 and the valve 452 downward for normally seating the latter against an annular valve seat 458 formed at the upper end of the bore 439. The upper side of the piston 455 is constantly open to the chamber 442 via a passageway 459 extending through the cover member 441 and the casing section 431 and opening at the wall surface of the bore 439 therein so that the upper face of the piston 455 is always subject to the pressure in the brake cylinder device 454. The lower face of the piston 455 is always subject to the pressure of fluid in the chamber 440 and has an area equal to the seated area of the valve 452 or the area of the annular valve seat 458 so that the forces of fluid under pressure acting on the valve 452 when unseated are balanced.

A passageway 460, having therein a choke 461, extends through the casing section 431 and opens at one end into the chamber 442 and at the opposite end into the chamber 436 above the diaphragm 435.

The outer periphery of the smaller diaphragm 434 is clamped between the casing section 433 and a cover member 462 which is secured to the casing section 433 by any suitable means (not shown). The center of the smaller diaphragm 434 is clamped between two diaphragm followers 463 and 464 which are secured together by a nut 465 that has screw-threaded engagement with a screw-threaded stem 466 that is formed integral with the diaphragm follower 463 and extends through a bore formed in the diaphragm follower 464.

The smaller diaphragm 434 cooperates with the casing section 433 and the cover member 462 to form within the double diaphragm self-lapping relay valve device 430 and on opposite sides of the diaphragm 434 a second pair of chambers 467 and 468. A cylindrical pusher stem 469 arranged coaxially with the diaphragms 435 and 434 has sealing, slidably guided contact with the wall of an aligned bore through a casing partition 470 separating the chamber 437 from the chamber 467, the ends of the pusher stem 469 abuttingly contacting, respectively, the lower screw-threaded end of the valve stem 444 and the upper side of the diaphragm follower 463.

Opening into the chamber 468 is one end of the hereinbefore-mentioned passageway and pipe 399, the opposite end of which pipe is connected to one end of the pipe T 361 as in the first embodiment of the invention. The chamber 467 above the diaphragm 434 is open to atmosphere via a passageway 471 extending through the casing section 433. In order to prevent leakage of fluid under pressure from the chamber 437 to the chamber 467 which is open to atmosphere, the casing partition 470 is provided with a groove in which is carried an O-ring 472 that surrounds the pusher stem 469 and forms a seal therewith.

The operation of a locomotive brake equipment including a double diaphragm self-lapping relay valve device 430 when installed on a locomotive unit equipped with composition type brake shoes and used as either a leading or as a trailing unit is substantially the same, with the exception of the operation of the double diaphragm self-lapping relay valve device 430 which will now be described in detail, as that of the locomotive brake equipment shown in FIGS. 2, 2A, and 2B. Hence, a detailed description of the operation of the entire equipment is not deemed necessary.

Fluid under pressure supplied to the pipe and passageway 399 in the manner hereinbefore described in detail in connection with the first embodiment of the invention flows to the chamber 468 below the smaller diaphragm 434. Since the chambers 467, 437 and 436 are all vented to atmosphere at this time, the fluid under pressure supplied to the chamber 468 is effective to deflect the smaller diaphragm 434 upward to, through the intermediary of the pusher stem 469, move the valve stem 444 upward against the yielding resistance of the spring 448, and cause the upper end of the valve stem 444 to first contact the bottom face of the flat disc valve 452 to close communication between the pipe and passageway 453 that opens into the chamber 442 having constant communication with the interior of bore 439 and atmosphere via the passageway 450 and the crossbore in the valve stem 444, chamber 443 and exhaust port 451. As the valve stem 444 continues to move upward, the flat disc valve 452 will be unseated from the annular valve seat 458. By unseating of the flat disc valve 452, fluid under pressure from the second main reservoir 4, which is present in the chamber 440, is permitted to flow past the now unseated flat disc valve 452 to the interior of the bore 439 from which it flows via the chamber 442 and the passageway and pipe 453 to the brake cylinder device 454 to cause an application of brakes on this locomotive unit.

Fluid under pressure also flows from the chamber 442 in the self-lapping relay valve device 430 via passageway 460 and choke 461 to the chamber 436 and is effective to establish a force that acts in a downward direction on the upper side of the larger diaphragm 435. Upon this force slightly exceeding the force acting upward on the smaller diaphragm 434 as a result of the fluid under pressure supplied to the chamber 468, the valve stem 444 will be moved downward until the spring 457, through the intermediary of the piston 455, seats the flat disc valve 452 on the annular valve seat 458. This cuts off flow of fluid under pressure from the main reservoir 4 to the brake cylinder device 454 on this locomotive unit.

It will be noted that, since the effective area of the diaphragm 435 is greater than the effective area of the diaphragm 434, when the pressure in the brake cylinder device 454 and the chamber 436 has increased to a value which is a selected proportion, such as, for example, sixty percent of the pressure of fluid in chamber 468, as determined by the ratio of the effective areas of the diaphragms 434 and 435, the diaphragm stack and hence the valve stem 444 will be shifted downward to a lap position in which the flat disc valve 452 will be seated by the spring 457, and the upper end of the valve stem 444 will sealingly abut the lower face of the valve 452, for thereby bottling up fluid under pressure in the brake cylinder device 454 and in the chamber 436 at the aforementioned selected proportion of the pressure in the chamber 468. By thus supplying fluid to the brake cylinder device 454 at a pressure which is a selected proportion of the pressure supplied to the chamber 468, the proper braking force is provided for applying the composition type brake shoes to the tread surface of their corresponding wheels to insure the required degree of braking on the locomotive unit equipped with composition type brake shoes, it being well known that since the coefficient of friction of the composition type of brake shoe is somewhat less than that of the cast iron type of brake shoe, a lesser degree of force is required to press the composition type of brake shoe against its corresponding wheel in order to provide the same braking effect.

Having now described the invention, what I claim as new and desire to secure by Letters Patent, is:

1. In a multiple unit locomotive brake control system comprising on each locomotive unit the combination of:
   (a) a vacuum brake pipe extending from end to end of the respective locomotive unit and connected to a corresponding vacuum brake pipe on an adjacent locomotive unit,
   (b) an exhauster and a storage reservoir evacuated thereby,
   (c) a communication extending between the storage reservoir and said vacuum brake pipe,
   (d) a fluid pressure brake pipe extending through the several locomotive units,
   (e) a first fluid pressure operated valve means disposed in said communication and operable in response to variations of pressure in said fluid pressure brake pipe for controlling evacuation of fluid under pressure from said vacuum brake pipe in response to evacuation of the corresponding reservoir by operation of the exhauster on the respective locomotive, said valve means being also operable to vary the amount of fluid at atmospheric pressure admitted to said vacuum brake pipe from a chosen maximum to a chosen minimum accordingly as the pressure in said fluid pressure brake pipe increases from a chosen minimum pressure to a chosen maximum pressure,
   (f) a source of fluid under pressure,
   (g) a manually operable engineer's brake valve device for controlling the supply of fluid under pressure from said source of fluid under pressure to said brake pipe to effect the charging thereof up to said chosen maximum pressure and for controlling the release of fluid under pressure from said fluid pressure brake pipe to atmosphere to effect a reduction in the pressure therein,
   (h) a pair of fluid pressure operated valve means interposed in series in said communication between the storage reservoir and said vacuum brake pipe, one disposed between the storage reservoir and said first fluid pressure operated valve means, and the other disposed between said first fluid pressure operated valve means and said vacuum brake pipe, said three valve means operative cooperatively for controlling the rate of evacuation of fluid under pressure from said vacuum brake pipe in response to evacuation of the corresponding reservoir by operation of the exhauster on the respective locomotive unit,
   (i) a fluid pressure operated emergency relay valve device operable to effect venting of fluid under pressure from said fluid pressure brake pipe at an emergency rate to cause an emergency brake application, and
   (j) a fluid pressure operated combined charging and break-in-two indication valve device operable so long as the pressure of fluid in said fluid pressure brake pipe is increasing at a rate in excess of a certain rate to effect the supply of fluid under pressure from said source of fluid under pressure to said pair of fluid pressure operated valve means on the corresponding locomotive unit to effect simultaneous operation thereof to effect, in cooperation with said first fluid pressure operated valve means, opening of said communication whereby fluid under pressure is evacuated from said vacuum brake pipe in response to evacuation of the corresponding reservoir, said fluid pressure operated combined charging and break-in-two indication valve device being also operable in response to the admittance of fluid at atmospheric pressure to said vacuum brake pipe at a rate in excess of a chosen rate as the result of rupture of said vacuum brake pipe to effect the supply of fluid under pressure from said source of fluid under pressure to said fluid pressure operated emergency relay valve device to cause the operation thereof.

2. A brake control system, as claimed in claim 1, further characterized in that said fluid pressure operated combined charging and break-in-two indication valve device comprises:
  (a) a first movable abutment subject on one side to fluid under pressure supplied from said fluid pressure brake pipe at an unrestricted rate and on its opposite side to fluid under pressure supplied from said fluid pressure brake pipe at a restricted rate, and
  (b) a second movable abutment subject on one side to a subatmospheric pressure supplied from said vacuum brake pipe at an unrestricted rate and on its opposite side to said subatmospheric pressure supplied from said vacuum brake pipe at a restricted rate.

3. A brake control system, as claimed in claim 1, further characterized in that said fluid pressure operated combined charging and break-in-two indication valve device comprises:
  (a) a first movable abutment subject on one side to fluid under pressure supplied from said fluid pressure brake pipe at an unrestricted rate and on its opposite side to fluid under pressure supplied from said fluid pressure brake pipe at a restricted rate,
  (b) first valve means operatively controlled by movement of said first movable abutment upon the supply of fluid under pressure from said fluid pressure brake pipe to said one side thereof so long as the pressure on said one side exceeds the pressure on said opposite side by a chosen amount to effect the supply of fluid under pressure from said source of fluid under pressure to said pair of fluid pressure operated valve means to cause operation thereof,
  (c) a second movable abutment subject on one side to a subatmospheric pressure supplied from said vacuum brake pipe at an unrestricted rate and on its opposite side to said subatmospheric pressure supplied from said vacuum brake pipe at a restricted rate, and
  (d) second valve means operatively controlled by movement of said second movable abutment upon the supply of fluid at atmospheric pressure to said one side at a rate in excess of said restricted rate to effect the supply of fluid under pressure from said source of fluid under pressure to said fluid pressure operated emergency relay valve device to cause the operation thereof,
  (e) said first and second valve means being so interlocked that said second valve means is effective to supply fluid under pressure from said source of fluid under pressure to said fluid pressure operated emergency relay valve device only while said first valve means is ineffective to supply fluid under pressure from said source of fluid under pressure to said pair of fluid pressure operated valve means.

4. In a multiple unit locomotive brake control system comprising on each locomotive unit the combination of:
  (a) a vacuum brake pipe extending from end to end of the respective locomotive unit and connected to a corresponding vacuum brake pipe on an adjacent locomotive unit,
  (b) an exhauster and a storage reservoir evacuated thereby,
  (c) a communication extending between the storage reservoir and said vacuum brake pipe,
  (d) a plurality of fluid pressure operated valve means interposed in series in said communication for controlling the evacuation of fluid under pressure from said vacuum brake pipe in response to evacuation of the corresponding reservoir by operation of the exhauster on the respective locomotive unit,
  (e) a source of fluid under pressure,
  (f) a fluid pressure brake pipe extending from end to end of the respective locomotive unit and connected to a corresponding fluid pressure brake pipe on an adjacent locomotive unit and to one of said plurality of fluid pressure operated valve means on the respective locomotive unit whereby said one fluid pressure operated valve means is operated solely in response to variations in pressure in said fluid pressure brake pipe,
  (g) a double check valve device,
  (h) a manually operable means selectively operable, at one time when the respective locomotive unit is a leading unit, to a first position to effect the supply of fluid under pressure from said source of fluid under pressure via one end of said double check valve device to a second one of said plurality of fluid pressure operated valve means to cause the operation thereof to open the corresponding communication, and operable, at another time, when the respective locomotive unit is a trailing unit, to a second position to cut off the supply of fluid under pressure from said source of fluid under pressure to said second one of said plurality of fluid pressure operated valve means and to connect said one end of said double check valve device to atmosphere, and
  (i) a fluid pressure operated combined charging and break-in-two indication valve device including means for causing it to operate so long as the pressure of fluid supplied to said fluid pressure brake pipe is increasing at a certain chosen rate, at both said one time and said another time, to effect the supply of fluid under pressure from said source of fluid under pressure to a third one of said plurality of fluid pressure operated valve means, said fluid pressure operated valve device being also operable at said another time, when the respective locomotive is a trailing unit, to effect the supply of fluid under pressure from said source of fluid under pressure simultaneously to said second and said third fluid pressure operated valve means, said supply of fluid under pressure to said second fluid pressure operated valve means being via the other end of said double check valve device, thereby to insure that said one, said second and said third fluid pressure operated valve means that are interposed in series in said communication are all operated to open the corresponding communication to effect the evacuation of fluid under pressure from said vacuum brake pipe so long as the pressure of fluid supplied to said fluid pressure brake pipe is increasing at said certain chosen rate regardless of whether the respective locomotive unit is a leading unit or a trailing unit.

5. A multi-unit locomotive brake control system, as claimed in claim 4, further characterized in that said brake control system comprises for each unit:
  (a) means effective in response to the destruction of vacuum in said vacuum brake pipe to cause an application of brakes on the respective unit, said means being so interlocked with said manually operable means as to be normally rendered ineffective upon manual operation of said manually operable means to its said second position,
  (b) fluid pressure operated valve means operable in response to the release of fluid under pressure therefrom to render said means effective to cause an application of brakes on the respective unit in response to the destruction of vacuum in said vacuum brake pipe notwithstanding said manually operable means in its said second position, and
  (c) a pipe extending from end to end of the respective locomotive unit, said pipe being connected to said source of fluid under pressure and to said fluid pressure operated valve means on said respective locomotive unit and to a corresponding pipe on an adjacent locomotive unit whereby simultaneous rupture of said pipe and said vacuum brake pipe at any point intermediate the ends of the multi-unit locomotive is effective to cause said means on each unit to effect an application of brakes on that unit independently of the other units.

6. A multi-unit locomotive brake control system, as claimed in claim 4, further characterized in that said brake control system further comprises for each unit:
 (a) fluid pressure operated brake control valve means for effecting an application and a release of brakes on the respective locomotive unit, and
 (b) fluid pressure operated valve means operable upon the pressure in said fluid pressure brake pipe exceeding a chosen value to connect said fluid pressure operated brake control valve means to said vacuum brake pipe whereby the operation of said fluid pressure operated brake control valve means is in response to variations in the subatmospheric pressure in said vacuum brake pipe, said fluid pressure operated valve means being operable, upon the pressure in said fluid pressure brake pipe being reduced to a value less than said chosen value, to cut off said vacuum brake pipe from said fluid pressure operated brake control valve means and to effect the supply of fluid under pressure from said source of fluid under pressure on the respective locomotive unit to said fluid pressure operated brake control valve means to cause the operation thereof to effect an application of brakes on the respective locomotive unit.

7. A multi-unit locomotive brake control system, as claimed in claim 4, further characterized in that said brake control system comprises for each locomotive unit:
 (a) fluid pressure operated brake control valve means for effecting an application and a release of brakes on the respective locomotive unit, said brake control valve means being so interlocked with said manually operable means as to be normally rendered ineffective upon manual operation of said manually operable means to its said second position,
 (b) fluid pressure operated valve means operable upon the pressure in said fluid pressure brake pipe exceeding a chosen value to connect said fluid pressure operated brake control valve means to said vacuum brake pipe whereby the operation of said fluid pressure operated brake control valve means is in response to variations in the subatmospheric pressure in said vacuum brake pipe, said fluid pressure operated valve means being operable, upon the pressure in said fluid pressure brake pipe being reduced to a value less than said chosen value, to cut off said vacuum brake pipe from said fluid pressure operated brake control valve means and to effect the supply of fluid under pressure from said source of fluid under pressure on the respective locomotive unit to said fluid pressure operated brake control valve means to cause the operation thereof to effect an application of brakes on the respective locomotive unit,
 (c) a fluid pressure operated valve device operable in response to the release of fluid under pressure therefrom to render said fluid pressure operated brake control valve means effective to cause an application of brakes on the respective locomotive unit notwithstanding said manually operable means being in its said second position, and
 (d) an equalizing pipe extending from end to end of the respective locomotive unit, said equalizing pipe being connected to said source of fluid under pressure and to said fluid pressure operated valve device on said respective locomotive unit and to a corresponding equalizing pipe on an adjacent locomotive unit whereby simultaneous rupture of said equalizing pipe and said fluid pressure brake pipe at any point intermediate the ends of the multi-unit locomotive is effective to cause the respective operation of said fluid pressure operated valve device on each locomotive unit to render the corresponding fluid pressure operated brake control valve means effective to cause an application of brakes on the corresponding locomotive unit, and of said fluid pressure operated valve means on each locomotive unit to cut off said vacuum brake pipe from said corresponding fluid pressure operated valve means and to effect the supply of fluid under pressure from said source of fluid under pressure on the corresponding locomotive unit to said corresponding fluid pressure operated brake control valve means to cause the operation thereof whereby an application of brakes is effected on each locomotive unit of the multi-unit locomotive independently of the other locomotive units.

8. A combined fluid pressure and vacuum brake control system for a multiple unit locomotive comprising on one of the locomotive units:
 (a) an exhauster and a corresponding storage reservoir evacuated thereby,
 (b) a vacuum brake pipe extending from end to end of the respective locomotive unit and connected to a corresponding vacuum brake pipe on an adjacent locomotive unit,
 (c) a communication extending between said storage reservoir and said vacuum brake pipe,
 (d) a fluid pressure brake pipe extending from end to end of the respective locomotive unit and connected to a corresponding fluid pressure brake pipe on an adjacent locomotive unit,
 (e) fluid pressure controlled means interposed in said communication and operable in response to variations of pressure in the fluid pressure brake pipe for varying the subatmospheric pressure in said vacuum brake pipe in accordance with corresponding variations of pressure in said fluid pressure brake pipe,
 (f) a source of fluid under pressure,
 (g) a brake cylinder device,
 (h) a brake control valve device comprising:
  (i) a diaphragm having a chamber on each side thereof, the chamber on one side of said diaphragm being in communication with said vacuum brake pipe,
  (ii) communication means between the chamber on the one side and the chamber on the other side of said diaphragm including choke means via which the evacuation of the chamber on the other side of said diaphragm is effected while the chamber on the one side of the diaphragm is being evacuated, and
  (iii) a valve means operated by said diaphragm, upon a predetermined reduction of the vacuum in said one chamber relative to that in said other chamber, to a fluid pressure supplying position,
 (i) a differential type fluid pressure operated relay valve device operably responsive to the fluid under pressure supplied by said valve means of said brake control valve device from said source in its fluid pressure supplying position to effect the supply of fluid under pressure from said source of fluid under pressure to said brake cylinder device, the degree of fluid pressure effected in said brake cylinder device being a selected proportion of the degree of fluid pressure supplied to said relay valve device,
 (j) a brake cylinder equalizing pipe extending from end to end of the locomotive unit and connected to a corresponding brake cylinder equalizing pipe on an adjacent locomotive unit,
 (k) a fluid pressure operated valve device for establishing a communication between the valve means of said brake control valve device and said brake cylinder equalizing pipe, and
 (l) another equalizing pipe extending from end to end of the locomotive unit, said another equalizing pipe being connected to said source of fluid under pressure and to said fluid pressure operated valve device on the locomotive unit, and to a corresponding equalizing pipe on an adjacent locomotive unit whereby, so long as said another equalizing pipe is charged with fluid under pressure from said source of fluid under pressure, said fluid pressure operated valve device establishes said communication thereby to enable the brake control valve device on the locomotive unit, when operating as the leading unit, to correspondingly charge the brake cylinder equalizing pipe on a trailing unit to control the application and the release of brakes on the trailing unit.

9. In combination, a combined fluid pressure and vacuum brake control system for a multiple unit locomotive, comprising on the leading locomotive unit a combined fluid pressure and vacuum brake control system as claimed in claim 8, and on the trailing locomotive unit a combined fluid pressure and vacuum brake control system including:
    (a) a brake cylinder equalizing pipe connected to the brake cylinder equalizing pipe on the leading locomotive unit and charged with fluid under pressure therefrom, and
    (b) a non-differential type fluid pressure operated relay valve device connected to said brake cylinder equalizing pipe and operably responsive to fluid under pressure therein to effect a brake application on the trailing locomotive unit.

10. A combined fluid pressure and vacuum brake control system for the one unit of a multiple unit locomotive, as claimed in claim 8, further characterized in that said differential type fluid pressure operated relay valve device comprises two operating diaphragms of unequal effective area arranged in a stack such that one side of the smaller diaphragm is subject to atmospheric pressure and the other side is subject to fluid under pressure supplied by said valve means of said brake control valve device to provide an operating force active in one direction, and one side of the larger diaphragm is subject to fluid under pressure supplied to said brake cylinder device and the opposite side is subject to atmospheric pressure to provide a balancing force active in a direction opposite to said one direction, the ratio of the effective areas of said diaphragms determining the ratio of the pressure established in said brake cylinder to said pressure supplied by said brake control valve device.

11. A combined fluid pressure and vacuum brake control system for one unit of a multiple unit locomotive, as claimed in claim 8, further characterized by:
    (a) a manually operable valve device having a first position in which a first communication between said valve means of said brake control valve device and said differential type fluid pressure operated relay valve device is open and a second position in which said first communication is closed, and
    (b) a fluid pressure operated valve device operable in response to a reduction in pressure in said another equalizing pipe in response to the rupture thereof to establish a second communication between said valve means of said brake control valve device and said differential type fluid pressure operated relay valve device in bypass of said first communication, whereby said valve means is rendered effective to supply fluid under pressure to said differential type fluid pressure operated relay valve device to cause an application of brakes on the locomotive unit upon rupture of said another equalizing pipe notwithstanding said manually operated valve device is in its said second position in which said first communication is closed, thereby always insuring a brake application on the locomotive unit upon pull-apart of said unit from another unit when said unit is the leading unit or a trailing unit of a multiple unit locomotive.

12. A multi-unit locomotive brake control system, as claimed in claim 4, further characterized in that said brake control system comprises for each unit:
    (a) a second double check valve device having one end connected to the side outlet of said first double check valve device and its side outlet connected to said second one of said plurality of fluid pressure operated valve means, and
    (b) a fluid pressure operated valve device operable in response to a reduction in pressure in said fluid pressure brake pipe to a certain chosen value to effect the supply of fluid under pressure from said source of fluid under pressure to the other end of said second double check valve device whereby said second one of said plurality of fluid pressure operated valve means is operated to its open position thereby to enable atmospheric air to flow to said vacuum brake pipe in response to the operation of said one of said plurality of fluid pressure operated valve means as a result of the reduction in pressure in said fluid pressure brake pipe to said certain chosen value.

13. In a locomotive brake control system comprising on a locomotive unit the combination of:
    (a) a vacuum brake pipe extending from end to end of the locomotive unit,
    (b) a fluid pressure brake pipe extending from end to end of the locomotive unit, and
    (c) a fluid pressure operated control valve device operated solely in accordance with variations of pressure in said fluid pressure brake pipe for correspondingly controlling the degree of subatmospheric pressure in said vacuum brake pipe, said fluid pressure operated control valve device comprising:
        (i) valve means for controlling the rate of flow of fluid under pressure to and from said vacuum brake pipe,
        (ii) cam means controlling operation of said valve means,
        (iii) a movable abutment subject on one side to the pressure in said fluid pressure brake pipe and operably connected to said cam means, and
        (iv) spring means yieldingly resisting movement of said cam means in one direction by said movable abutment,
        (v) the configuration of said cam means being such as to so control operation of said valve means as to insure a straight-line relationship between the subatmospheric pressure in said vacuum brake pipe and the pressure in said fluid pressure brake pipe whereby the pressure in said vacuum brake pipe varies from atmospheric pressure to a certain chosen subatmospheric pressure as the pressure in said fluid pressure brake pipe varies from a chosen minimum superatmospheric pressure to a chosen maximum superatmospheric pressure.

14. In a locomotive brake control system comprising on a locomotive unit the combination of:
    (a) a vacuum brake pipe extending from end to end of the locomotive unit,
    (b) an exhauster and a storage reservoir evacuated thereby,
    (c) a fluid pressure brake pipe extending from end to end of the locomotive unit, and
    (d) a fluid pressure operated control valve device operated solely in accordance with variations of pressure in said fluid pressure brake pipe for correspondingly controlling the evacuation of fluid under pressure from said vacuum brake pipe in response to evacuation of said storage reservoir by operation of said exhauster, said fluid pressure operated control valve device comprising:
        (i) a valve seat connected on one side to atmosphere and on the other side to said vacuum brake pipe and said reservoir,
        (ii) a valve for controlling the rate of flow of fluid at atmospheric pressure past said valve seat to said vacuum brake pipe and said reservoir,
        (iii) cam means including a cam roller operatively connected to said valve and a cam having a contour in contact with said roller, (iv) means supporting said cam for longitudinal movement relative to said roller,
(v) spring means yieldingly opposing longitudinal movement of said cam in one direction, and
(vi) a movable abutment operatively connected to said cam and subject on one side to the pressure in said fluid pressure brake pipe whereby as the pressure in said fluid pressure brake pipe increases from a chosen minimum to a chosen maximum, said abutment moves said cam such that the contour of said cam causes said roller to impart such movement to said valve toward said valve seat as to so vary the pressure in said vacuum brake pipe from atmospheric pressure to a certain chosen subatmospheric pressure as to thereby maintain a straight-line relationship between the subatmospheric pressure in said vacuum brake pipe and the superatmospheric pressure in said fluid pressure brake pipe as the pressure in said fluid pressure brake pipe is varied from said chosen minimum to said chosen maximum.

References Cited by the Examiner

UNITED STATES PATENTS

| | | | |
|---|---|---|---|
| 2,804,352 | 8/1957 | May | 303—4 |
| 2,822,220 | 2/1958 | May | 303—4 |
| 2,861,842 | 11/1958 | Borst | 303—4 |
| 3,206,257 | 9/1965 | May | 303—4 |

EUGENE G. BOTZ, *Primary Examiner.*